United States Patent
Figger et al.

(10) Patent No.: US 10,820,529 B2
(45) Date of Patent: Nov. 3, 2020

(54) VARIABLE SPEED DRIVE FOR LARGE SQUARE BALER

(71) Applicant: AGCO Corporation, Duluth, GA (US)

(72) Inventors: Robert L. Figger, Hesston, KS (US); Kevin J. Hamilton, Hesston, KS (US); Darren J. Nelson, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 354 days.

(21) Appl. No.: 16/067,005

(22) PCT Filed: Dec. 22, 2016

(86) PCT No.: PCT/US2016/068299
§ 371 (c)(1),
(2) Date: Jun. 28, 2018

(87) PCT Pub. No.: WO2017/116982
PCT Pub. Date: Jul. 6, 2017

(65) Prior Publication Data
US 2020/0163282 A1    May 28, 2020

Related U.S. Application Data

(60) Provisional application No. 62/273,317, filed on Dec. 30, 2015.

(51) Int. Cl.
*A01F 15/08* (2006.01)
*A01F 15/04* (2006.01)
(Continued)

(52) U.S. Cl.
CPC ........ *A01F 15/0841* (2013.01); *A01F 15/042* (2013.01); *F16H 9/14* (2013.01); *A01F 15/101* (2013.01); *A01F 2015/102* (2013.01)

(58) Field of Classification Search
CPC .. A01F 15/0841; A01F 15/042; A01F 15/101; A01F 2015/102; F16H 9/04;
(Continued)

(56) References Cited

U.S. PATENT DOCUMENTS 2,834,177 A    5/1958   Russell
3,006,207 A *  10/1961  Russell ............... A01F 15/0841
                                                    474/21
(Continued)

FOREIGN PATENT DOCUMENTS

CN    203723108 U    7/2014
EP    0819374 A1     1/1998
(Continued)

OTHER PUBLICATIONS

UK Intellectual Property Office, International Searrch Report for related UK Application No. GB1602815.1, dated Aug. 18, 2016.
(Continued)

*Primary Examiner* — Jimmy T Nguyen

(57) ABSTRACT

A square baler (30) includes a chassis (32), a plunger (36), and a variable speed transmission (42). The plunger assembly (36) includes a reciprocating plunger head (76) slidably mounted relative to the chassis (32) and operable to reciprocate within a chamber (54) to apply a compressive force against the material. The transmission (42) includes drive (86) and driven components (90) and an endless drive element (98) that drivingly interconnects the components. The driven component is drivingly connected to the plunger head. The drive component is operable to be driven by a prime mover at a drive input speed. At least one of the components has an adjustable operating diameter so that the driven component has a variable output speed.

7 Claims, 20 Drawing Sheets

(51) Int. Cl.
*F16H 9/14* (2006.01)
*A01F 15/10* (2006.01)

(58) Field of Classification Search
CPC ..... F16H 9/10; F16H 9/14; F16H 9/16; F16H 9/18; F16H 9/20
See application file for complete search history.

(56) References Cited

U.S. PATENT DOCUMENTS

| | | | | |
|---|---|---|---|---|
| 3,295,384 | A | * | 1/1967 | Love ..................... A01D 41/12 474/27 |
| 3,381,542 | A | * | 5/1968 | Close ........................ F16H 9/16 474/30 |
| 3,525,302 | A | * | 8/1970 | Eberly ................ A01F 15/0841 100/179 |
| 6,186,915 | B1 | * | 2/2001 | Dietl ........................ F16H 9/14 474/13 |
| 2003/0167939 | A1 | | 9/2003 | Roth |
| 2005/0096163 | A1 | * | 5/2005 | Gu ........................ F16H 63/067 474/10 |
| 2009/0291788 | A1 | | 11/2009 | Hokari et al. |
| 2014/0165859 | A1 | | 6/2014 | O'Reilly et al. |
| 2017/0105355 | A1 | * | 4/2017 | Rosseel ............... A01F 15/0841 |

FOREIGN PATENT DOCUMENTS

| | | |
|---|---|---|
| EP | 1637383 A2 | 3/2006 |
| EP | 2502485 A1 | 9/2012 |
| GB | 2281361 A | 3/1995 |
| WO | 2014/106633 A1 | 7/2014 |

OTHER PUBLICATIONS

European Patent Office, International Search Report for related International Application No. PCT/US2016/068299, dated Mar. 27, 2017.

* cited by examiner

VARIABLE SPEED DRIVE FOR LARGE SQUARE BALER

CROSS REFERENCE TO RELATED APPLICATION

This application claims the benefit of U.S. Provisional Application No. 62/273,317, filed Dec. 30, 2015, which is hereby incorporated by reference in its entirety.

BACKGROUND

Field of Invention

The present invention relates generally to agricultural equipment. More specifically, embodiments of the present invention concern an agricultural square baler with a variable speed drive.

Discussion of Prior Art

Prior art in-line hay balers include a reciprocating plunger and other moving equipment that are powered by a prime mover (such as an agricultural tractor or other towing vehicle). Conventional balers include a transmission that is powered by the prime mover and transfers power to the reciprocating plunger. The transmission includes a flywheel that provides rotational momentum to support smooth and continuous operation of the plunger. Components of the transmission are designed to transfer relatively large amounts of torque, particularly when initiating baler operation, due to the relatively large mass of the flywheel and the plunger.

However, conventional hay balers and hay baler transmissions have various deficiencies. For example, the large mass of the baler's moving components (including the flywheel and the plunger) causes the baler to be difficult for a tractor to start. As a result, it may take an excessive amount of time for the tractor to bring the baler up to its operating speed. Alternatively, the mass of the moving components may cause the tractor to stall when attempting to start the baler. Furthermore, the mass of moving components found in a conventional baler may cause failure, excessive wear, or other harm to a component of the baler transmission and/or a component of the tractor, particularly when initiating baler operation.

SUMMARY

The following brief summary is provided to indicate the nature of the subject matter disclosed herein. While certain aspects of the present invention are described below, the summary is not intended to limit the scope of the present invention.

Embodiments of the present invention provide a square baler that does not suffer from the problems and limitations of the prior art balers set forth above.

A first aspect of the present invention concerns a square baler operable to be powered by a prime mover. The square baler broadly includes a chassis, a plunger, and a variable speed transmission. The chassis presents a baling chamber in which material is compacted and baled. The plunger assembly includes a reciprocating plunger head slidably mounted relative to the chassis and operable to reciprocate within the chamber to apply a compressive force against the material. The variable speed transmission includes drive and driven components and an endless drive element that drivingly interconnects the components. The driven component is drivingly connected to the plunger head. The drive component is operable to be driven by the prime mover at a drive input speed. At least one of the components has an adjustable operating diameter so that the driven component has a variable output speed.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Preferred embodiments of the invention are described in detail below with reference to the attached drawing figures, wherein.

Figure 1:
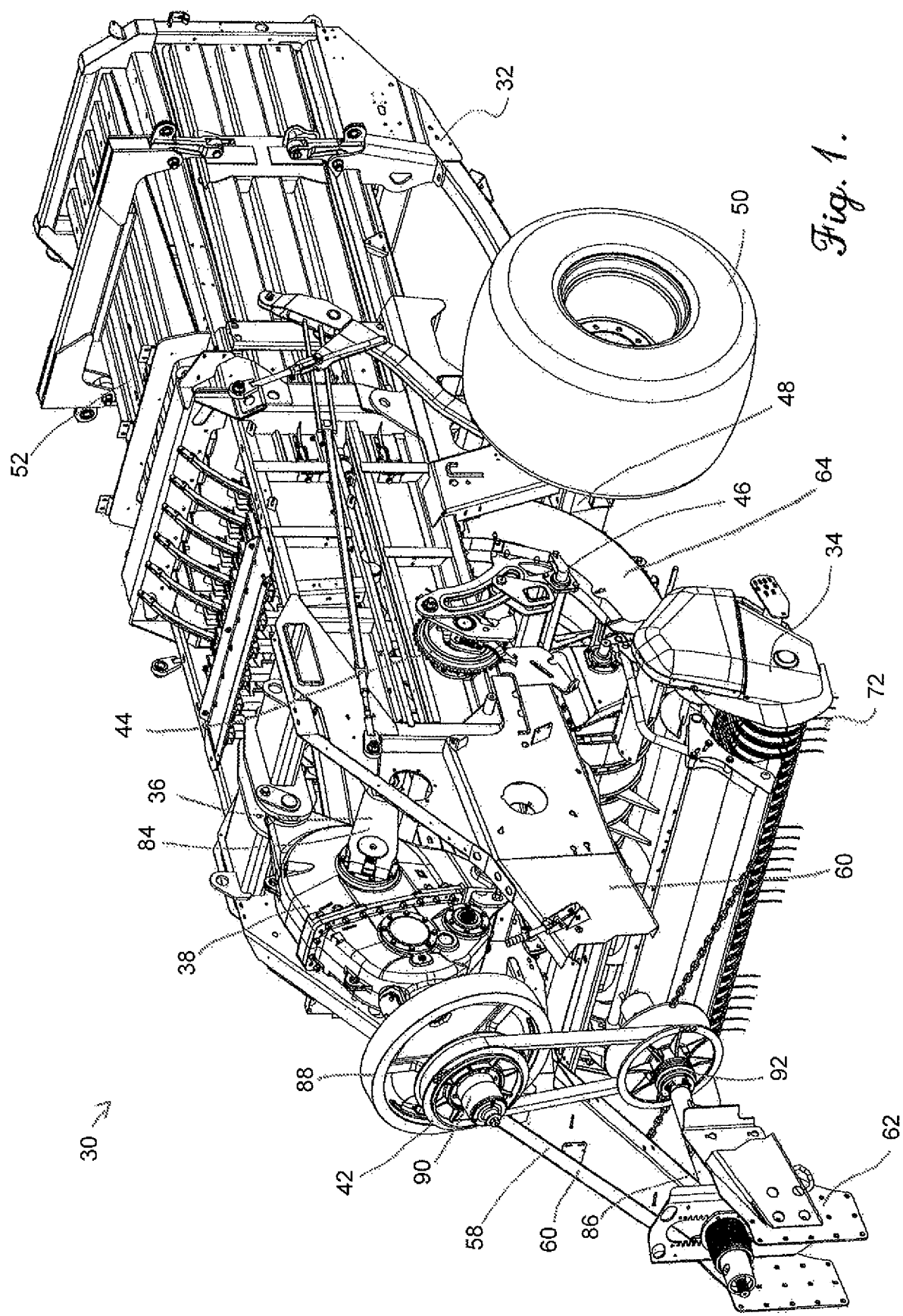
FIG. 1 is a perspective of an agricultural square baler constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 2:
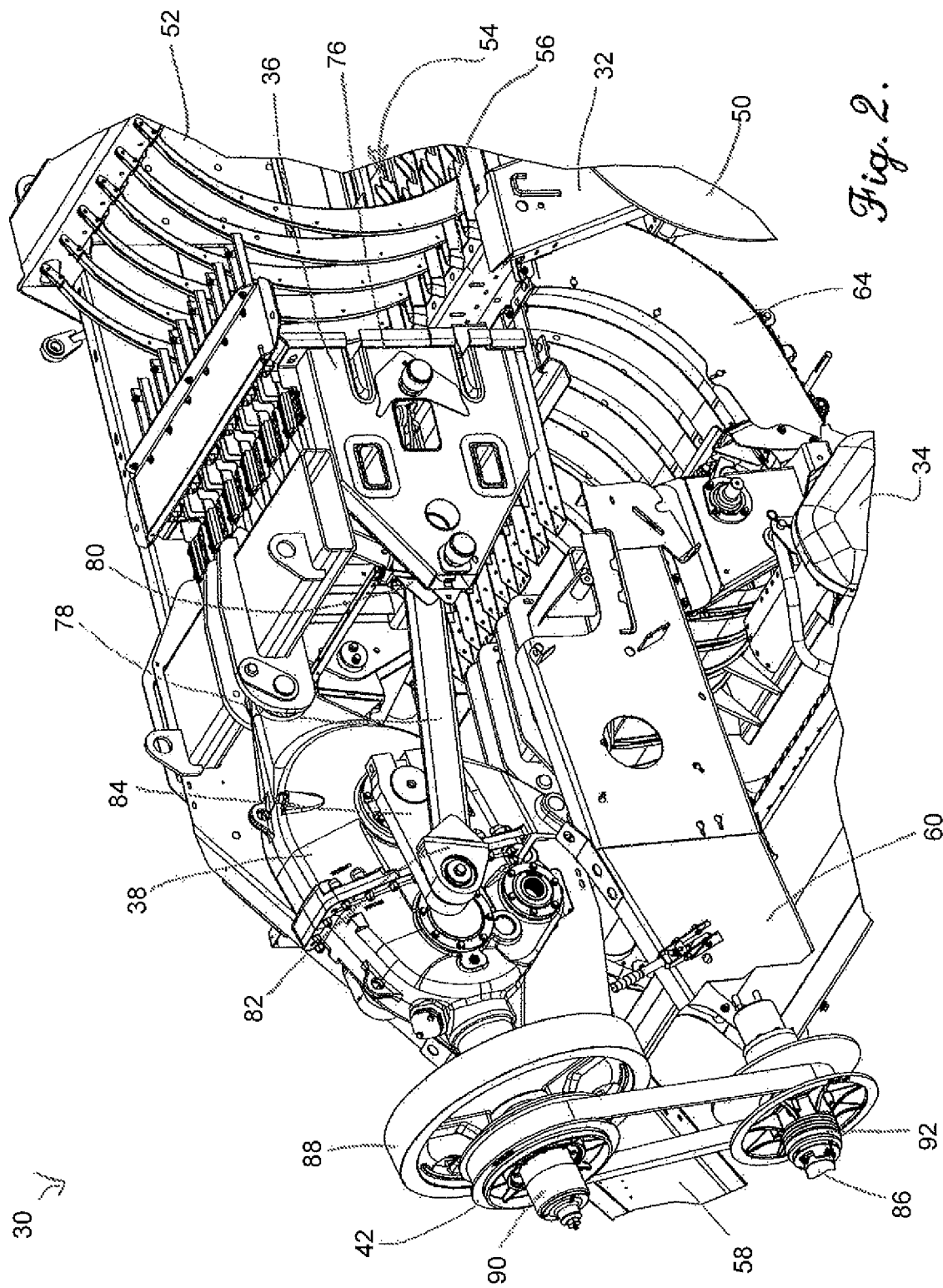
FIG. 2 is a fragmentary perspective of the agricultural square baler shown in FIG. 1, showing a transmission, a plunger drive, and a plunger assembly operably mounted on a chassis.
Figure 3:
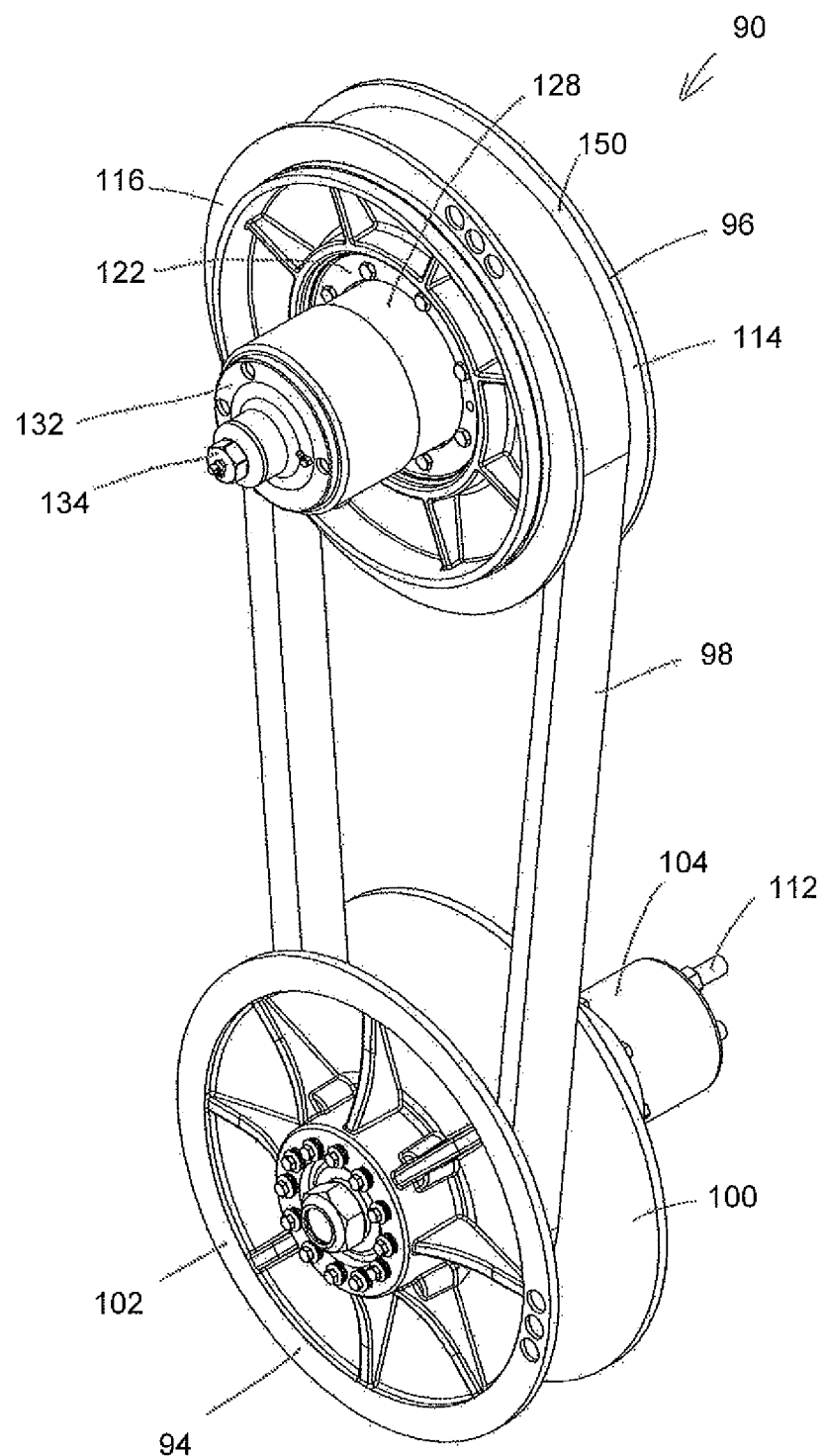
FIG. 3 is a front perspective of a variable speed drive of the transmission shown in FIGS. 1 and 2, showing a drive sheave, a driven sheave, and an endless drive belt, with the variable speed drive being in a speed reducing condition.
Figure 4:
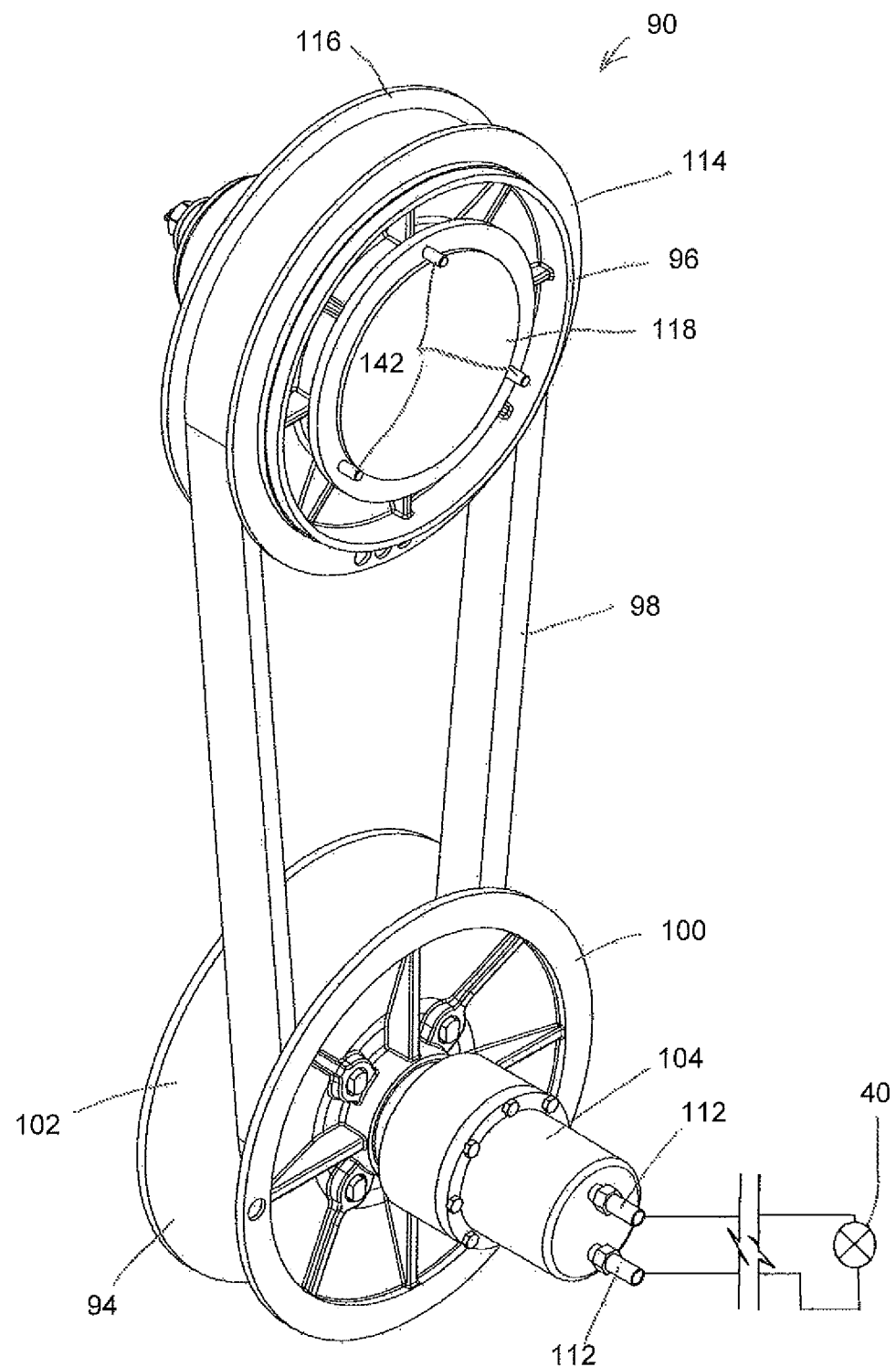
FIG. 4 is a rear perspective of the variable speed drive shown in FIGS. 1-3, showing a rotary union of the drive fluidly connected to a pump of the baler.
Figure 5:
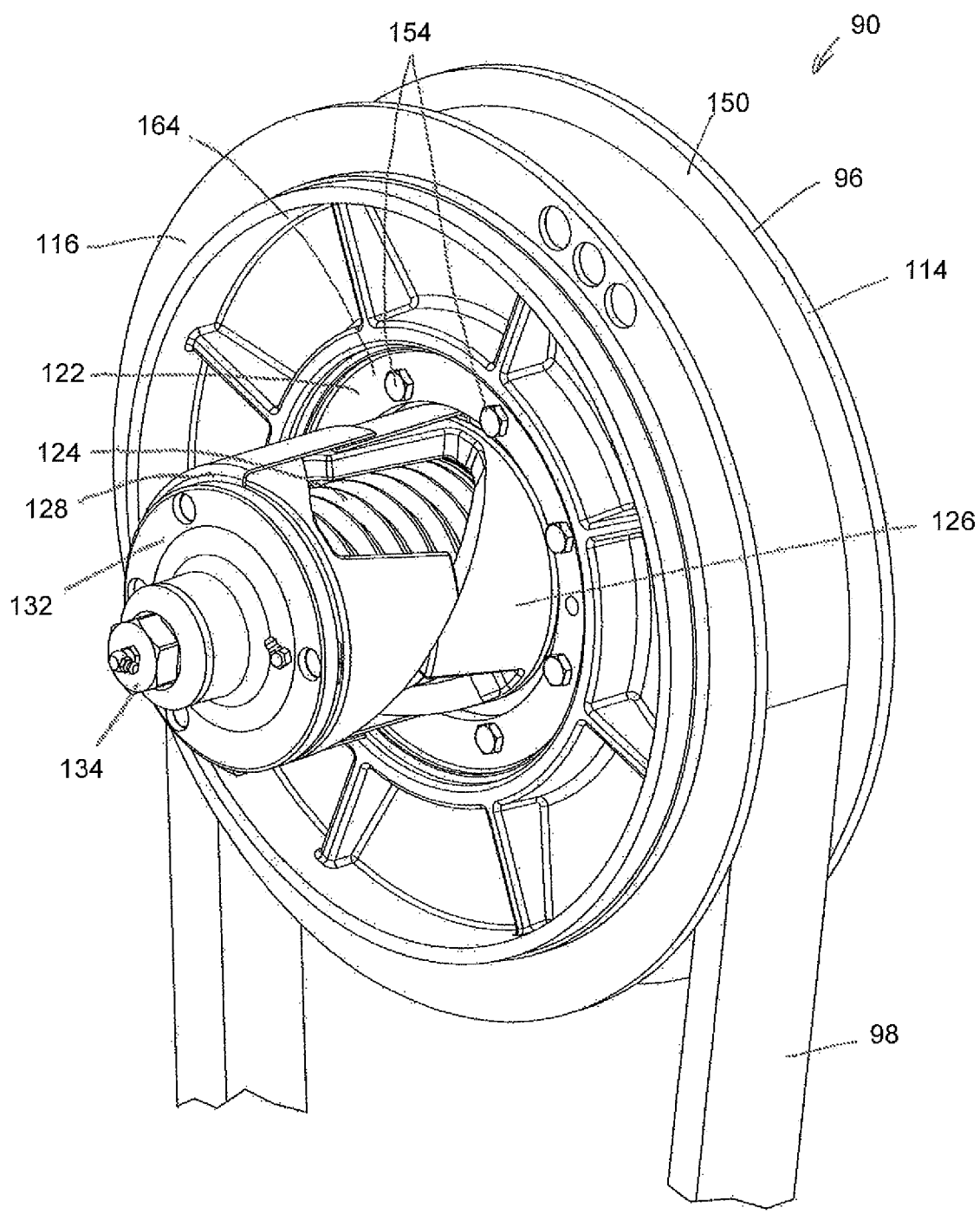
FIG. 5 is an enlarged fragmentary front perspective of the variable speed drive shown in FIGS. 1-4, showing a dust cover of the driven sheave broken away to depict a spring and spring housing of the driven sheave.

Turning initially to FIGS. 1 and 2, an agricultural square baler 30 is constructed in accordance with a preferred embodiment of the present invention. In the usual manner, the square baler 30 is configured to be towed by a towing vehicle (such as an agricultural tractor) to pick up a windrow (not shown) of severed crop material and to form the crop material into multiple bales (not shown).

It will be appreciated that the baler 30 can be used to form bales from various types of crop material, such as prairie grass, wheat, oats, alfalfa, sudangrass, sorghum, silage, etc.

The illustrated baler 30 is configured to form bales that generally have the shape of a rectangular parallelepiped (so called "square" bales). However, various aspects of the present invention are applicable where the baler 30 forms bales with a generally cylindrical shape (so called "round" bales).

The illustrated baler 30 preferably includes a wheeled chassis 32, pickup header 34, plunger assembly 36, plunger drive 38, pump 40, baler transmission 42, stuffer drive 44, and stuffer 46 (see FIGS. 1-4).

The wheeled chassis 32 is configured to support various baler components while the baler 30 is towed across a field. The chassis 32 includes an axle 48 and a pair of wheels 50 that support the rest of the baler 30 as the baler 30 is advanced above the ground (see FIG. 1).

Figure 20:
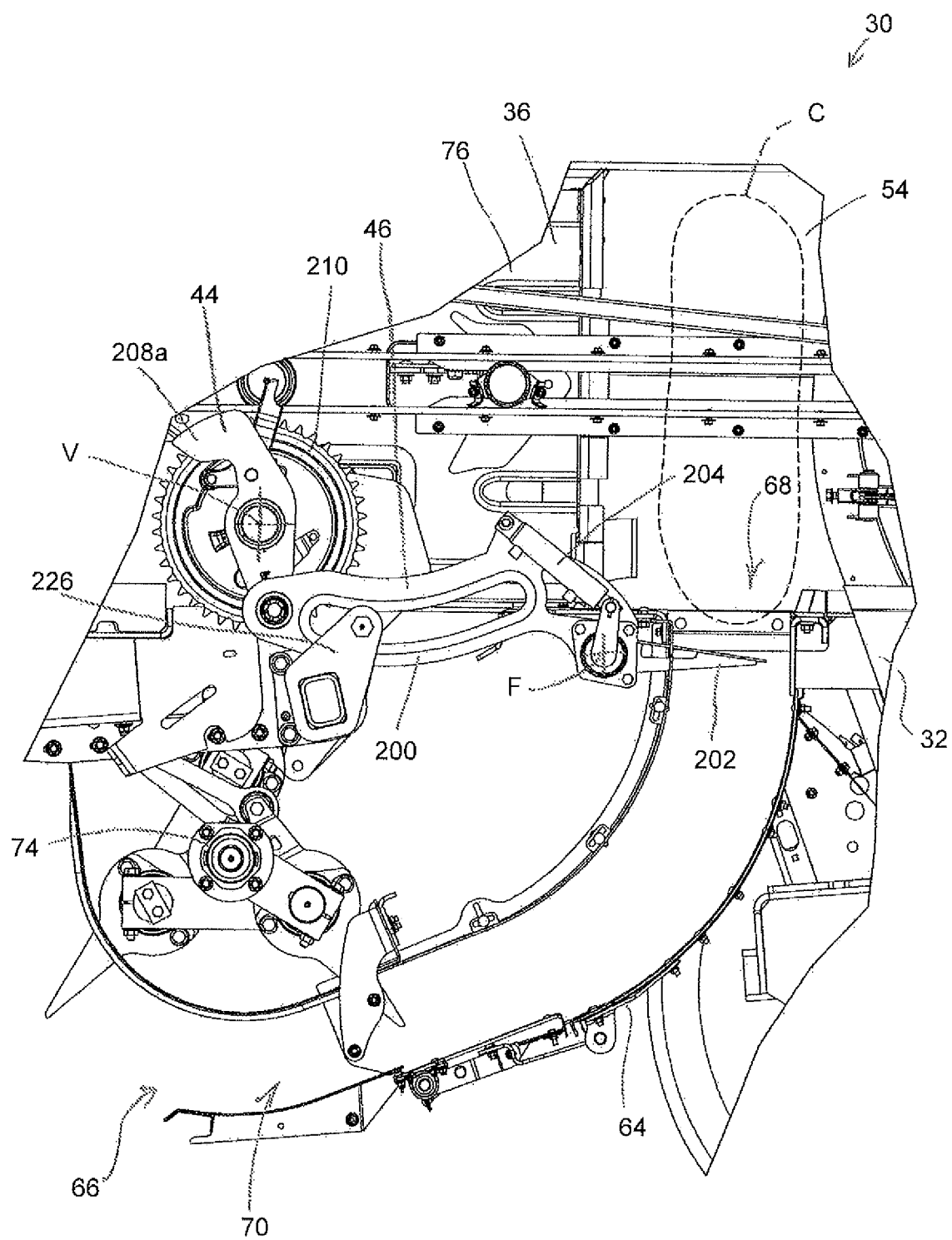
FIG. 20 is a fragmentary side elevation of the agricultural square baler similar to FIG. 18, but with the fork of the stuffer in a loading location where the fork has advanced the charge of loose crop material upwardly and rearwardly into the baling chamber to provide a full stuffing stroke.

Furthermore, the chassis includes a bale forming frame 52 that extends along a longitudinal axis of the baler 30 and defines a baling chamber 54 in which charges C of crop material are compacted and formed into bales (see FIG. 20). The frame 52 also presents a downward facing chamber inlet 56 that communicates with the baling chamber 54.

The wheeled chassis 32 also preferably includes a tongue 58 that extends forwardly from the frame 52 along the longitudinal axis to be connected to the towing vehicle. The tongue 58 includes a pair of converging beams 60 that are joined at a hitch 62 of the tongue 58.

Loose crop material is introduced to the baling chamber 54 by passing through the chamber inlet 56. The crop material generally moves in a rearward direction while being compacted in the baling chamber 54. Once crop material is formed into a completed bale, the frame 52 guides the bale rearwardly for ejection from the baler 30.

Figure 17:
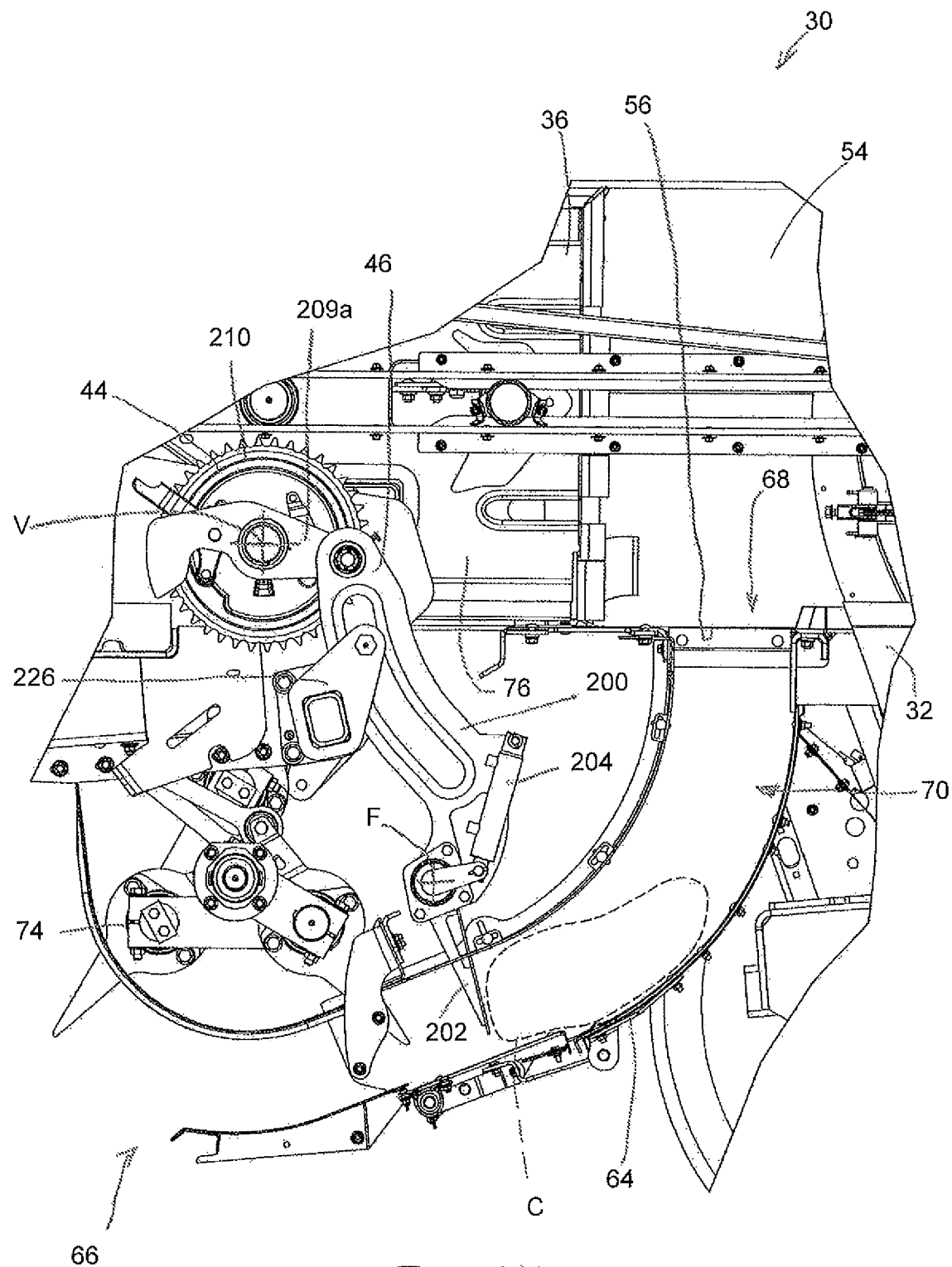
FIG. 17 is a fragmentary side elevation of the agricultural square baler similar to FIG. 16, but with the fork of the stuffer in an insertion location where prongs of the fork are inserted into the duct passage to engage the charge of loose crop material.
Figure 18:
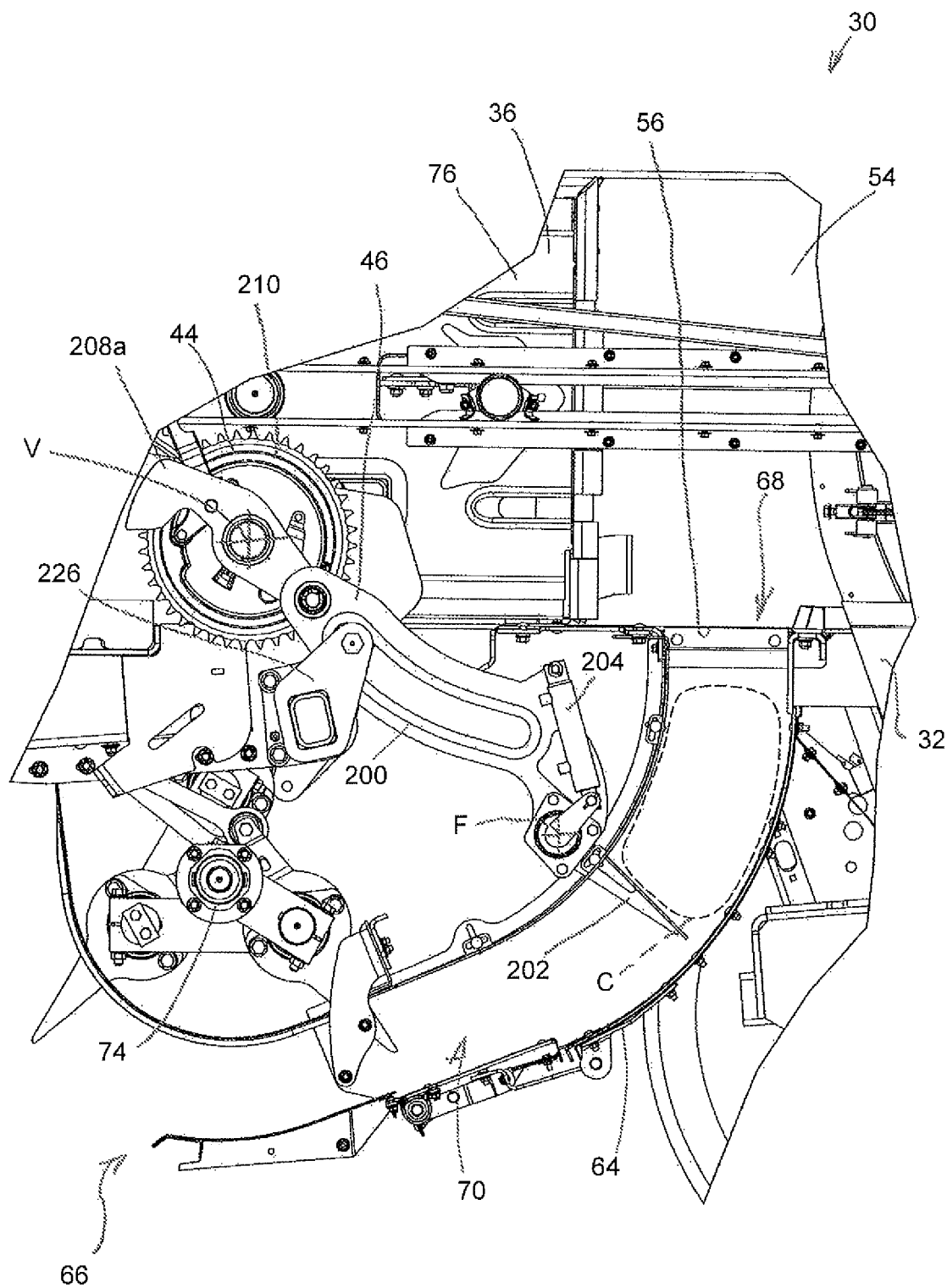
FIG. 18 is a fragmentary side elevation of the agricultural square baler similar to FIG. 17, but with the fork of the stuffer in an intermediate location where the fork has advanced the charge of loose crop material upwardly and rearwardly along the loading duct.

Turning to FIGS. 1, 2, and 11-13, the chassis 32 also includes a loading duct 64 operably connected to the frame 52. The loading duct 64 presents a forward facing duct inlet 66, an upwardly facing duct outlet 68, and a continuous duct passage (or path) 70 that extends continuously between the inlet 66 and the outlet 68 (see FIG. 17). As will be discussed, the stuffer 46 is configured to transfer the charge C of crop material along the duct passage 70 toward the outlet 68.

The duct outlet 68 is positioned to communicate with the chamber inlet 56 so that the loading duct 64 communicates with the baling chamber 54. Thus, the duct outlet 68 and chamber inlet 56 permit loose crop material to be advanced from the duct passage 70 to the baling chamber 54.

In the usual manner, the inlet 66 is operably connected to the pickup header 34. The header 34 includes a series of rotating tines 72 that collect the windrow from the ground and move the windrow in a generally upward and rearward direction toward the inlet 66. The header 34 also operates to consolidate the crop material of the windrow toward a longitudinal center line of the baler 30 using rotating stub augers (not shown). The baler 30 also includes a rotating fork assembly 74 located adjacent the header 34 to move crop material from the inlet 66 and into the duct 64.

The plunger assembly 36 is configured to compact loose crop material into one or more compacted bales by making successive compaction strokes. The plunger assembly 36 includes a plunger 76 and a pair of connecting rods 78 (see FIG. 2). During a compaction stroke, the plunger 76 slides rearwardly within the baling chamber 54 to a rearmost position (see FIG. 1). In the rearmost position, the plunger 76 generally blocks the chamber inlet 56 to restrict crop material from entering the baling chamber 54. During an opposite retraction stroke, the plunger 76 slides forwardly within the baling chamber 54 to a forwardmost position (see FIG. 2). In the forwardmost position, the plunger 76 is spaced forwardly of the chamber inlet 56 to permit the introduction of loose crop material to the baling chamber 54.

The plunger 76 is pivotally connected to each of the connecting rods 78 at rear rod ends 80 (see FIG. 2). The opposite forward rod ends 82 are pivotally connected to crank arms 84 of the plunger drive 38 (see FIG. 2). Thus, as the crank arms 84 spin, the connecting rods 78 cause the plunger 76 to reciprocate within the baling chamber 54 by making alternating compaction and retraction strokes.

As each new charge C of loose crop material is introduced through the chamber inlet 56, the charge C is moved rearwardly (see FIGS. 16-20) and compacted by the plunger assembly 36 during a corresponding one of the compaction strokes. The compaction stroke forms the loose crop material into a compacted flake (not shown) of the bale. Additional successive charges C of loose crop material are moved into the baling chamber 54 and compacted to form a series of compacted flakes. Once a predetermined bale length is reached, the flakes are bound together with twine string by a tying mechanism.

Variable Speed Drive

Turning to FIGS. 1-10, the transmission 42 directs power from a drive shaft (not shown) of the towing vehicle (such as the power-take-off shaft of a tractor) to the plunger drive 38. As will be discussed, the transmission 42 provides variable speed operation of the baler 30 that enables the towing vehicle to reliably initiate baler operation.

The transmission 42 preferably includes an articulated drive shaft 86, a flywheel 88, and a variable speed drive 90. The articulated drive shaft 86 preferably transmits power from the drive shaft of the towing vehicle to the variable speed drive 90. The drive shaft 86 is operably supported by the tongue 58 and is drivingly attached to the variable speed drive 90 by a universal joint 92.

While the baler 30 is preferably powered by the towing vehicle, the baler 30 could have an alternative configuration. For instance, the baler 30 could include a power source, such as an internal combustion engine, to operate the baler 30.

In the usual manner, the flywheel 88 provides a rotating mass that supports smooth rotating operation of the plunger drive 38. The flywheel 88 is drivingly attached to an input shaft (not shown) of the plunger drive 38. The flywheel 88 is also attached to the variable speed drive 90.

The variable speed drive 90 is operable to selectively change the rotation speed from the drive shaft 86 to the flywheel 88. As will be discussed, the drive 90 is particularly configured to reduce the rotation speed when initiating baler operation so that operation of various moving baler components (such as the plunger drive 38 and the plunger assembly 36) can be started without harming the baler 30 and/or the towing vehicle.

The illustrated drive 90 preferably comprises a continuously variable transmission that is configured to provide multiple drive output speeds. The drive 90 preferably includes an adjustable drive sheave 94, an adjustable driven sheave 96, and an endless drive belt 98. As will be discussed, the sheaves 94,96 cooperatively provide the drive 90 with an adjustable speed ratio. The speed ratio is defined as the ratio of a rotational output speed of the driven sheave 96 to a rotational input speed of the drive sheave 94.

The drive sheave 94 presents an adjustable drive operating diameter D1 (see FIG. 6A) and is operable to be selectively expanded and retracted to change the size of the drive operating diameter D1. As will be discussed, the drive sheave 94 has fixed and sliding cones 100,102 that are shiftable relative to one another to change the drive operating diameter D1. Preferably, the drive sheave 94 includes the fixed cone 100, the sliding cone 102, and a hydraulic rotary union 104.

Each cone 100,102 includes an integral hub. The sliding cone 102 has a piston 106 formed with the hub and slidably mounted on the hub of the fixed cone 100 so that the hubs are slidably connected to one another (see FIG. 6A). The piston 106 of the sliding cone 102 and the hub of the fixed cone 100 cooperatively form a pair of hydraulic chambers 108,110 to receive hydraulic fluid for controlling movement of the sliding cone 102 (see FIG. 6A).

The hydraulic union 104 is attached to a pair of hydraulic lines 112 that fluidly communicate with corresponding chambers 108,110. As pressurized fluid is supplied by one of the lines 112 to pressurize the corresponding chamber, with hydraulic pressure to the other chamber being removed, the cones 100,102 move toward each other into a closed position (see FIGS. 6a and 7). As pressurized fluid is supplied by the other one of the lines 112 to pressurize the corresponding chamber, with hydraulic pressure to the other chamber being removed, the cones 100,102 move away from each other into an open position (see FIGS. 3 and 4). The drive operating diameter D1 of the drive sheave is at a maximum value in the closed position and is at a minimum value in the open position. The lines 112 are hydraulically connected to the pump 40 so that each line 112 can be selectively pressurized and depressurized by the pump 40 (see FIG. 4).

The drive sheave 94 is preferably adjustable to change the drive operating diameter D1 and to correspondingly change a speed ratio of the drive 90. However, for some aspects of the present invention, the drive sheave 94 could have a fixed operating diameter. For instance, to alternatively change the speed ratio of the drive 90, an adjustment sheave (not shown) could be slidably mounted to the chassis 32 to selectively increase or decrease belt tension. Specifically, the adjustment sheave could be moved to generally increase tension in the endless drive belt 98 such that the drive belt 98 urges the cones of the driven sheave 96 apart and thereby reduces the operating diameter of the driven sheave 96. That is, the drive belt 98 could be tensioned to overcome the spring force (as discussed below) that normally urges the cones of the driven sheave 96 together. Similarly, the adjustment sheave could be moved to generally reduce tension in the endless drive belt 98 such that the drive belt 98 permits the cones of the driven sheave 96 to move toward each other and thereby increases the operating diameter of the driven sheave 96. Also, while an adjustment sheave could be provided in addition to the sheaves 94,96, one of the sheaves 94,96 could be slidably mounted to move toward or away from the other sheave 94,96 to selectively increase or decrease belt tension.

Figure 6A:
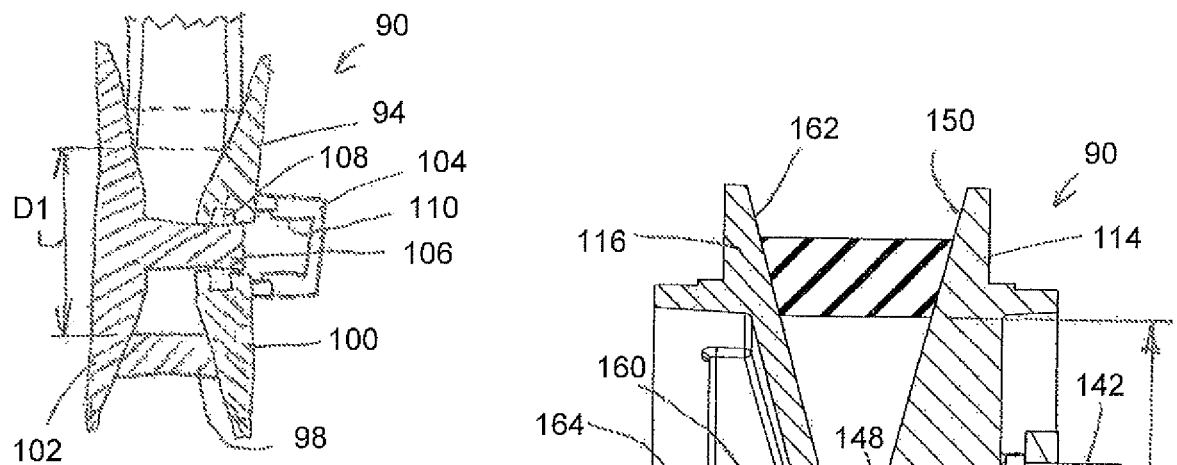
FIG. 6A is a fragmentary schematic cross section of the variable speed drive shown in FIGS. 1-4, showing fixed and sliding cones of the drive sheave in an open position, with the cones and the rotary union cooperatively defining chambers to receive hydraulic fluid.
Figure 6B:
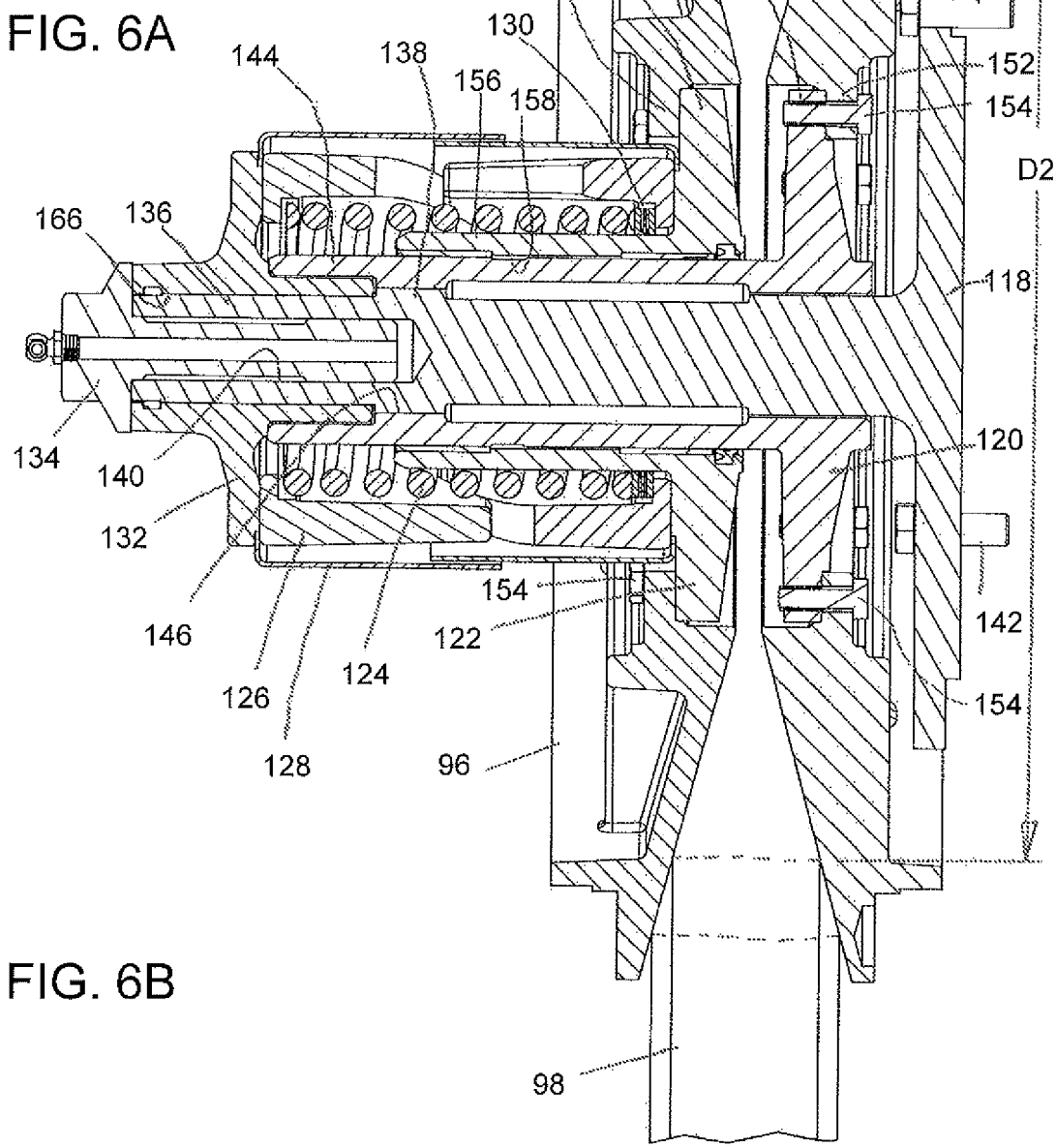
FIG. 6B is a fragmentary cross section of the variable speed drive shown in FIGS. 1-4, showing fixed and sliding cones of the driven sheave in a closed position.
Figure 7:
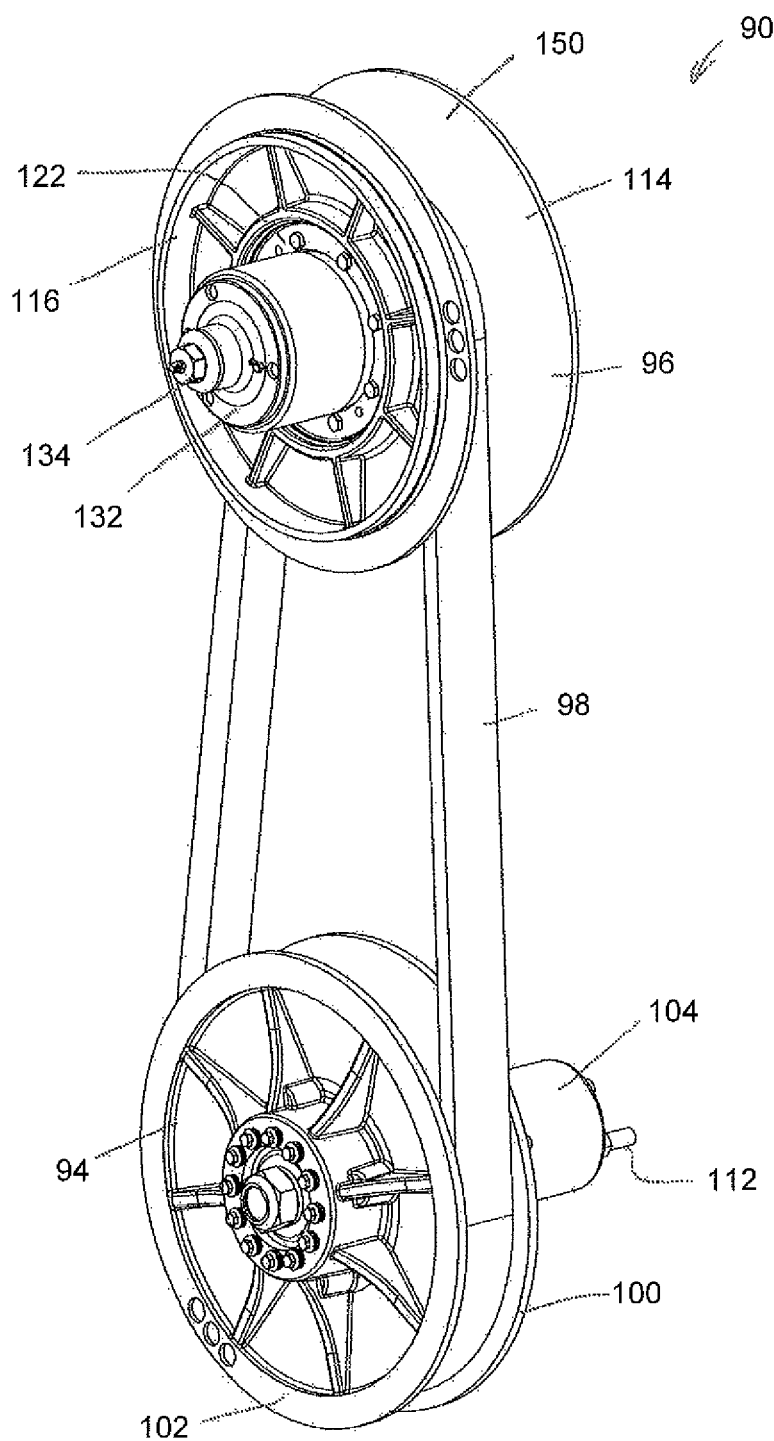
FIG. 7 is a front perspective of the variable speed drive similar to FIG. 3, but showing the variable speed drive in a speed increasing condition, with the fixed and sliding cones of the drive sheave in a closed position and the fixed and sliding cones of the driven sheave in an open position.
Figure 8:
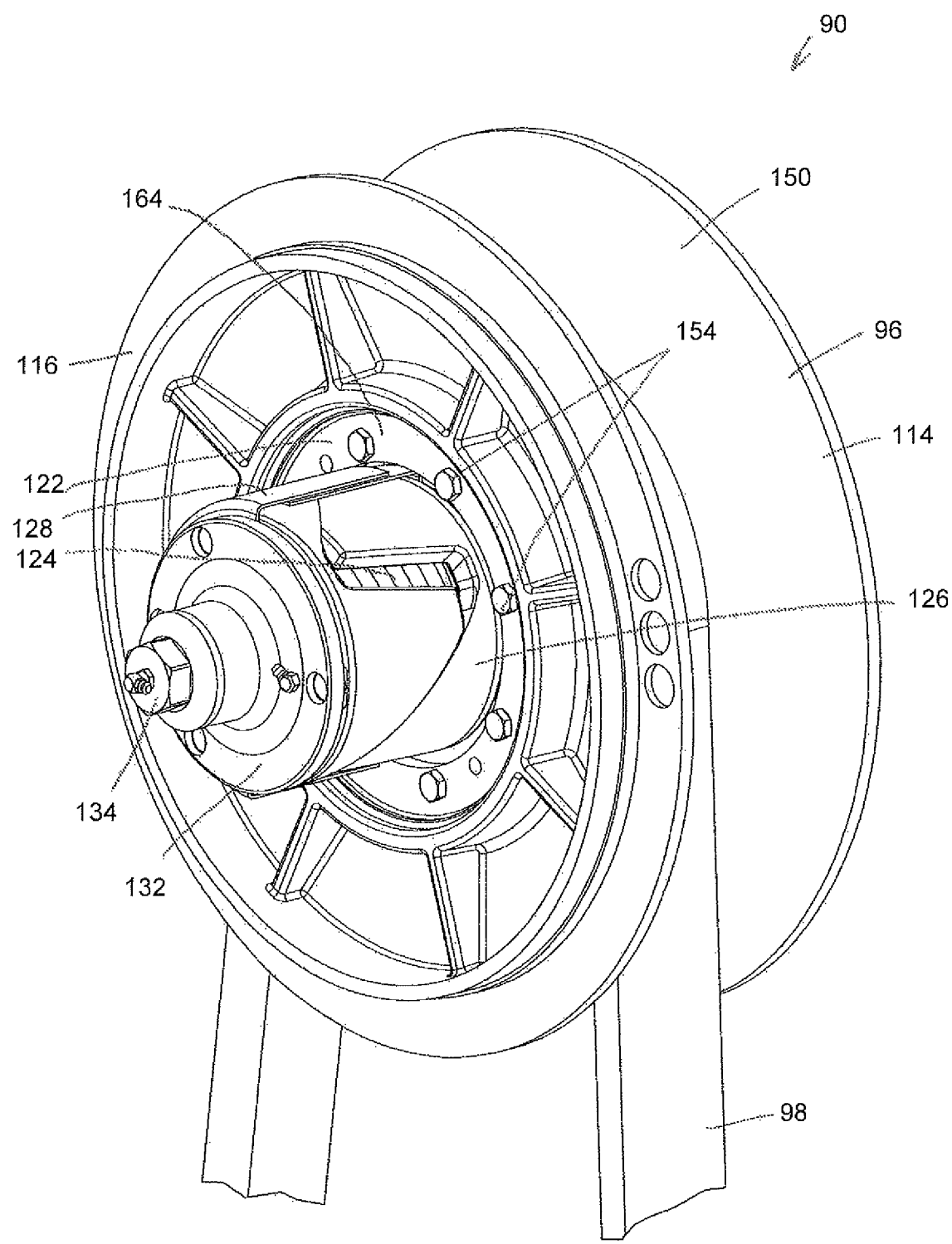
FIG. 8 is an enlarged fragmentary front perspective of the variable speed drive similar to FIG. 5, but showing the variable speed drive in the speed increasing condition, with the driven sheave in the open position.

The driven sheave 96 presents an adjustable driven operating diameter D2 and is operable to be selectively expanded and retracted to change the size of the driven operating diameter D2 (see FIG. 6B). As will be discussed, the driven sheave 96 has fixed and sliding cones 114,116 that are shiftable relative to one another to change the driven operating diameter D2. Preferably, the driven sheave 96 includes a mounting hub 118, fixed hub 120, fixed cone 114, sliding hub 122, sliding cone 116, spring 124, spring housing 126, dust cover 128, thrust bearings 130, cap 132, and bolt 134 (see FIG. 6B).

Figure 9:
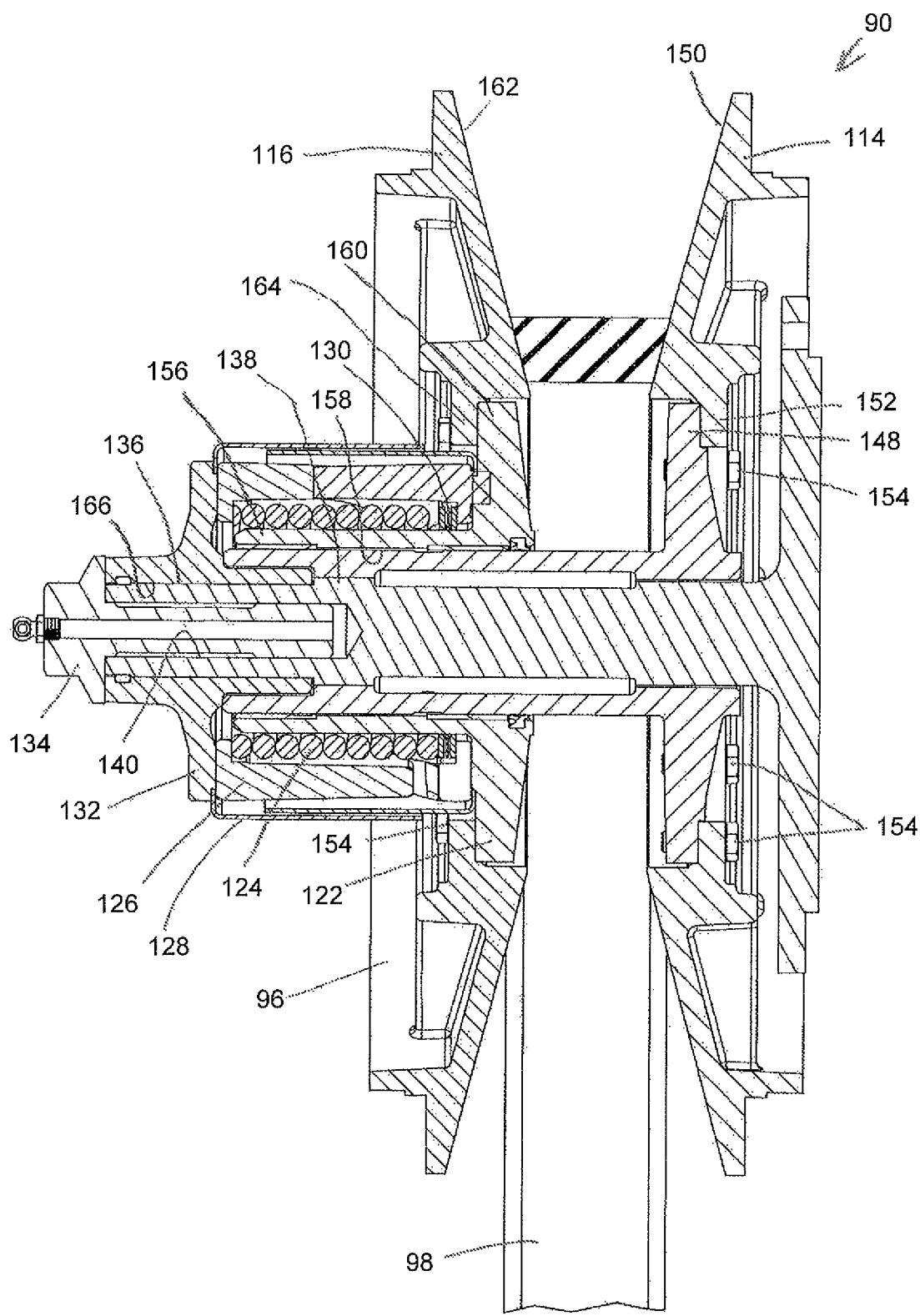
FIG. 9 is a fragmentary cross section of the variable speed drive similar to FIG. 6B, but showing the variable speed drive in the speed increasing condition, with the driven sheave in the open position.
Figure 10:
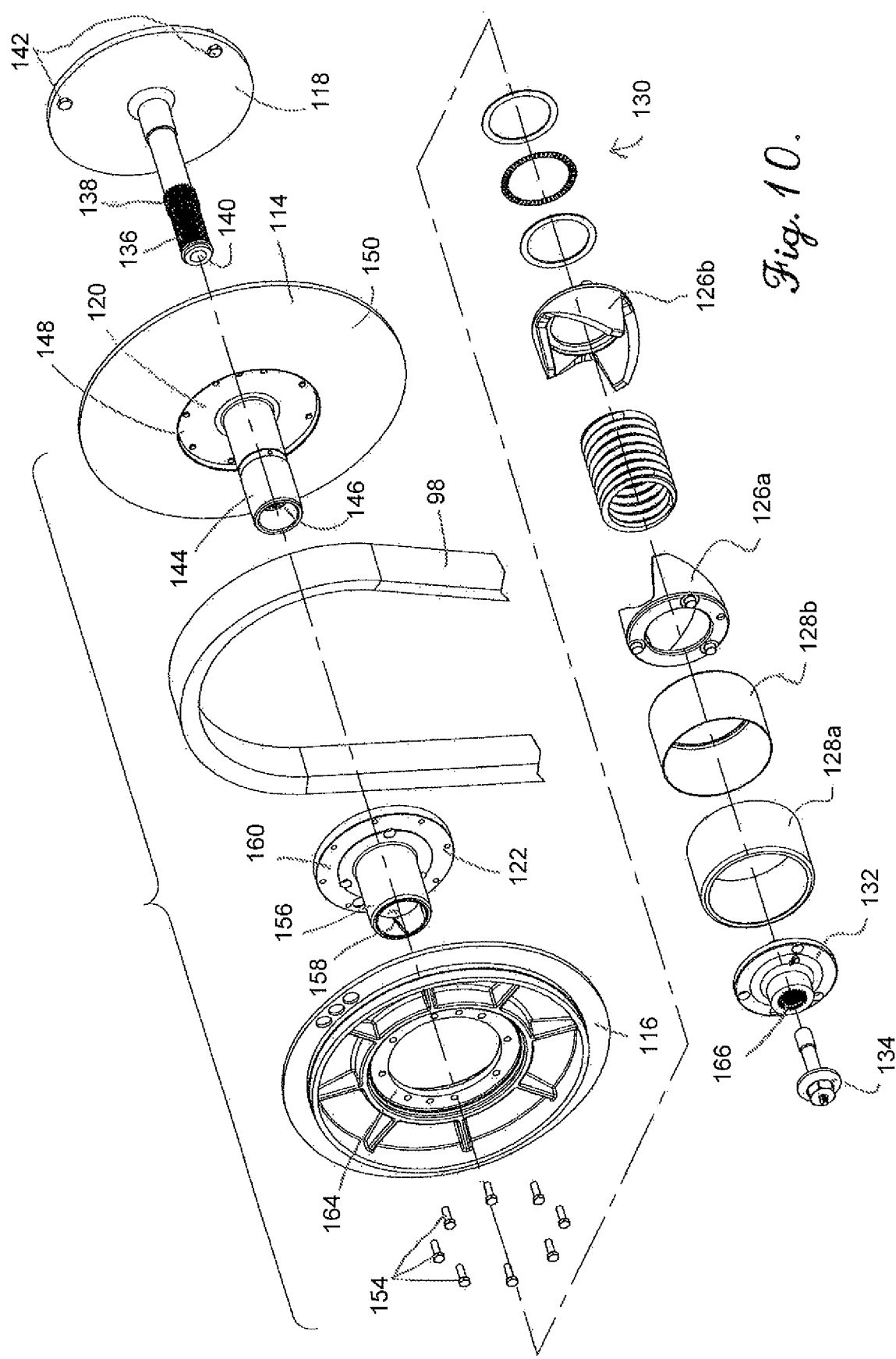
FIG. 10 is a fragmentary exploded perspective of the variable speed drive shown in FIGS. 1-9, showing the endless drive belt and the driven sheave.
Figure 11:
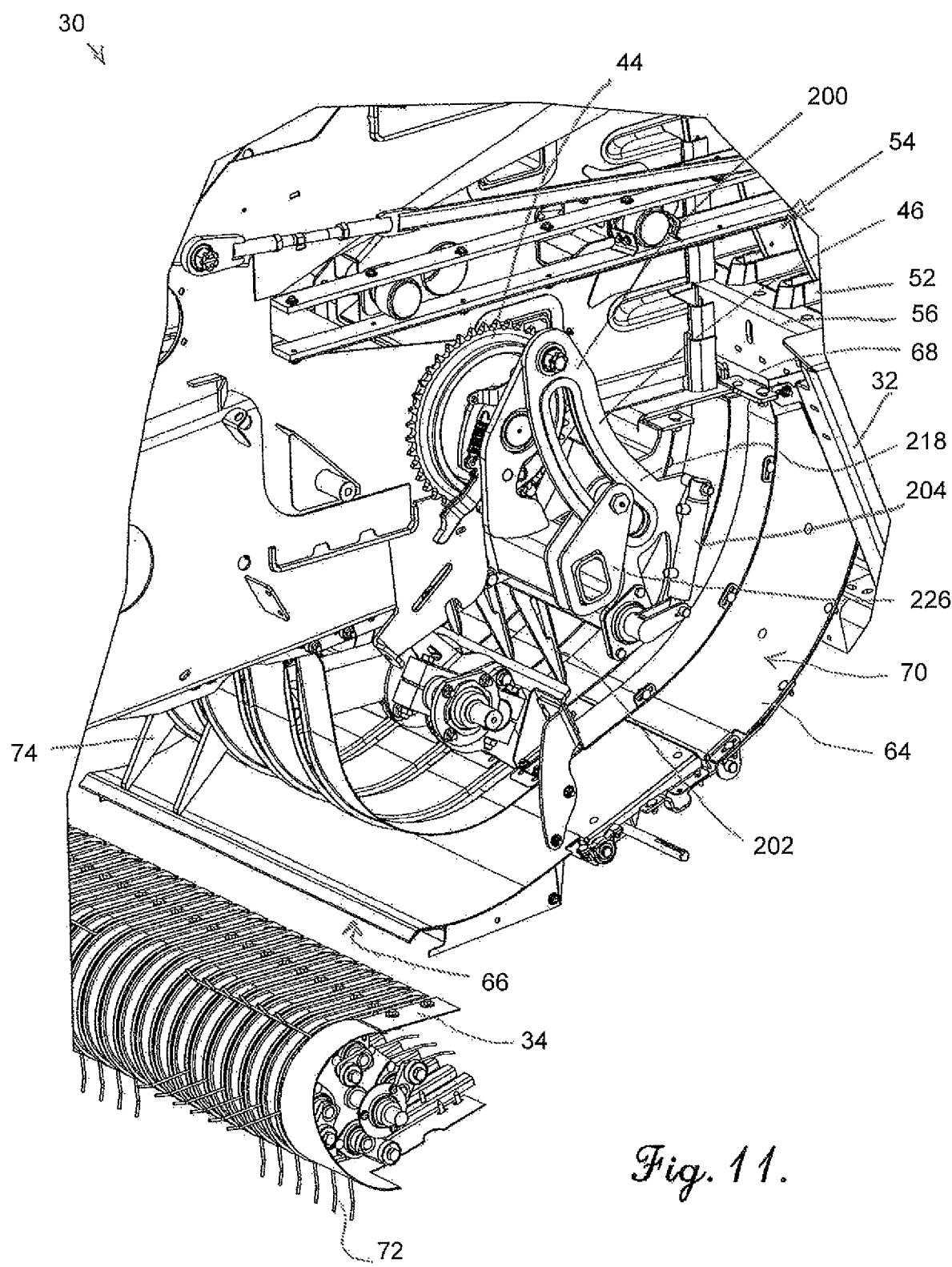
FIG. 11 is a fragmentary front perspective of the agricultural square baler shown in FIGS. 1 and 2, showing a stuffer drive and stuffer operably supported by the chassis.
Figure 12:
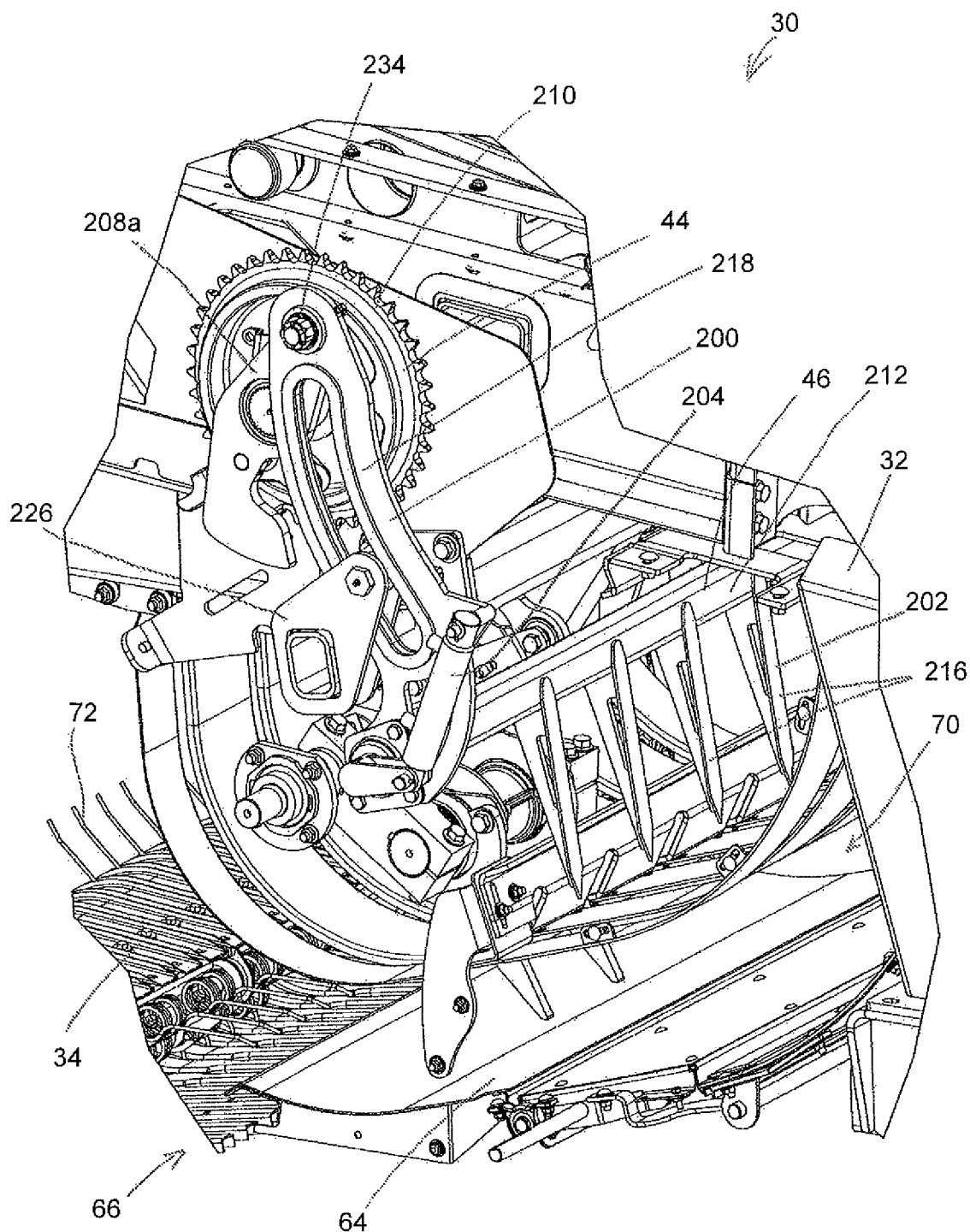
FIG. 12 is a fragmentary rear perspective of the agricultural square baler shown in FIGS. 1, 2, and 11, showing the stuffer drive and stuffer.

The mounting hub 118 has a unitary construction and includes a shaft with splined sections 136,138 and a threaded bore 140 (see FIGS. 6b, 9, and 10). The mounting hub 118 is attached to the flywheel 88 with fasteners 142, such that the mounting hub 118 spins with the flywheel 88.

The fixed hub 120 includes a tube 144 that presents a splined bore 146 and also includes a hub flange 148 integrally formed with the tube 144 (see FIGS. 6b, 9 and 10). The fixed cone 114 presents a conical belt surface 150 and includes a cone flange 152. The hub 120 and cone 114 are removably attached to each other by securing the flanges 148,152 together with threaded fasteners 154.

Similarly, sliding hub 122 includes a tube 156 that presents a bore 158 and also includes a hub flange 160 integrally formed with the tube 156 (see FIGS. 6b, 9 and 10). The sliding cone 116 presents a conical belt surface 162 and includes a cone flange 164. The hub 122 and cone 116 are removably attached to each other by securing the flanges 160,164 together with threaded fasteners 154.

The fixed hub 120 and cone 114 are movably secured on the mounting hub 118 by inserting the shaft through the splined bore 146 so that the splined section 136 engages corresponding splines of the fixed hub 120.

The sliding hub 122 and cone 116 are removably mounted on the fixed hub 120 and cone 114 by inserting the tube 156 of the fixed hub 120 through the bore 158 of the sliding hub 122. The hubs 120,122 are slidably engaged with each other so that the cones 114,116 can slide toward and away from one another.

The spring housing 126 includes two separable halves 126a,b that each present a toothed collar and an opening to receive the spring 124. The spring housing 126 is mounted on the sliding hub 122 so that the toothed collars are interdigitated and the spring 124 is located within the housing 126.

The dust cover 128 includes two halves 128a,b that are telescopically engaged with one another. The dust cover 128 is shiftably received on the spring housing 126 so that each half 128a,b of the dust cover 128 moves with a corresponding half 126a,b of the spring housing 126.

The cap 132 includes a splined bore 166 that is slidably engaged with the splined section 136 of the shaft. The bolt 134 is threaded into the bore 140 of the shaft so that the cap 132 engages the end of the tube 144 and the spring housing 126.

The spring 124 is configured to urge the cones 114,116 toward each other into a normally closed position. As a result, the spring 124 urges the cones 114,116 to move so as to generally increase the operating diameter D2 of the driven sheave 96. However, the spring 124 also permits the cones 114,116 to move away from one another toward an opposite open position. The operating diameter D2 of the driven sheave 96 is at a maximum value in the normally closed position and is at a minimum value in the open position.

The drive 90 assumes a speed reducing condition when the drive sheave 94 is shifted into the open position. In particular, with the drive sheave 94 in the open position, the spring 124 of the driven sheave 96 moves the driven sheave 96 to the normally closed position. Thus, in the speed reducing condition, the operating diameter D1 of the drive sheave 94 is at a minimum value and the operating diameter D2 of the driven sheave 96 is at a maximum value. The illustrated drive 90 has a speed ratio in the speed reducing condition that preferably ranges from about 0.5:1 to about 1:1 and, more preferably, is about 2:3.

It has been found that the speed reducing condition is particularly effective for initiating operation of the baler 30. Specifically, the speed reducing condition allows the towing vehicle to smoothly and reliably initiate movement of the various baler mechanisms. Because the baler mechanisms have a substantial combined mass, the speed reduction provided by the drive permits the vehicle to initiate baler operation while minimizing the possibility that the vehicle stalls and/or minimizing the possibility that the baler or vehicle becomes damaged from starting the baler mechanisms.

The drive 90 assumes a speed increasing condition when the drive sheave 94 is shifted into the closed position. In particular, with the drive sheave 94 in the closed position, the spring 124 of the driven sheave 96 permits the driven sheave 96 to move to the open position. Thus, in the speed increasing condition, the operating diameter D1 of the drive sheave 94 is at a maximum value and the operating diameter D2 of the driven sheave 96 is at a minimum value. The illustrated drive 90 has a speed ratio in the speed increasing condition that preferably ranges from about 1:1 to about 2:1 and, more preferably, is about 1.5:1. The speed increasing condition enables the baler 30 to operate quickly and efficiently while making bales.

While both sheaves 94,96 are preferably adjustable to change the speed ratio of the drive 90, one of the sheaves 94,96 could have a fixed operating diameter. For instance, where the driven sheave 96 has a fixed operating diameter, an idler sheave (not shown) could be slidably mounted to the chassis 32 to maintain a desired range of belt tension as the drive sheave 94 is adjusted.

While the illustrated drive 90 preferably comprises a belt drive, the drive 90 could have an alternative endless element. For instance, the drive 90 could include an endless chain. Furthermore, various aspects of the present invention are applicable where the drive 90 includes another type of variable transmission.

Baler Stuffer

Turning to FIGS. 11-20, the stuffer 46 is configured to sweep loose crop material along the duct passage 70 using a series of stuffing strokes. During at least some of the stuffing strokes, the stuffer 46 loads the loose crop material into the baling chamber 54. As will be described in greater detail, the stuffer 46 is operable to sweep crop material with either a partial stuffing stroke or a full stuffing stroke. The stuffer 46 preferably includes a stuffer frame 200, a stuffer fork 202, and a hydraulic cylinder 204.

The stuffer drive 44 powers the stuffer 46 through the series of stuffing strokes and is driven by an accessory shaft (not shown) of the plunger drive 38. The stuffer drive 44 includes a drive shaft 206 that extends laterally across the width of the baler 30 and presents opposite shaft ends. The stuffer drive 44 also includes crank arms 208a,b and sprocket 210 mounted on respective ends of the drive shaft 206. The stuffer drive 44 is configured to spin about a drive axis V during baler operation (see FIGS. 16-20).

Figure 13:
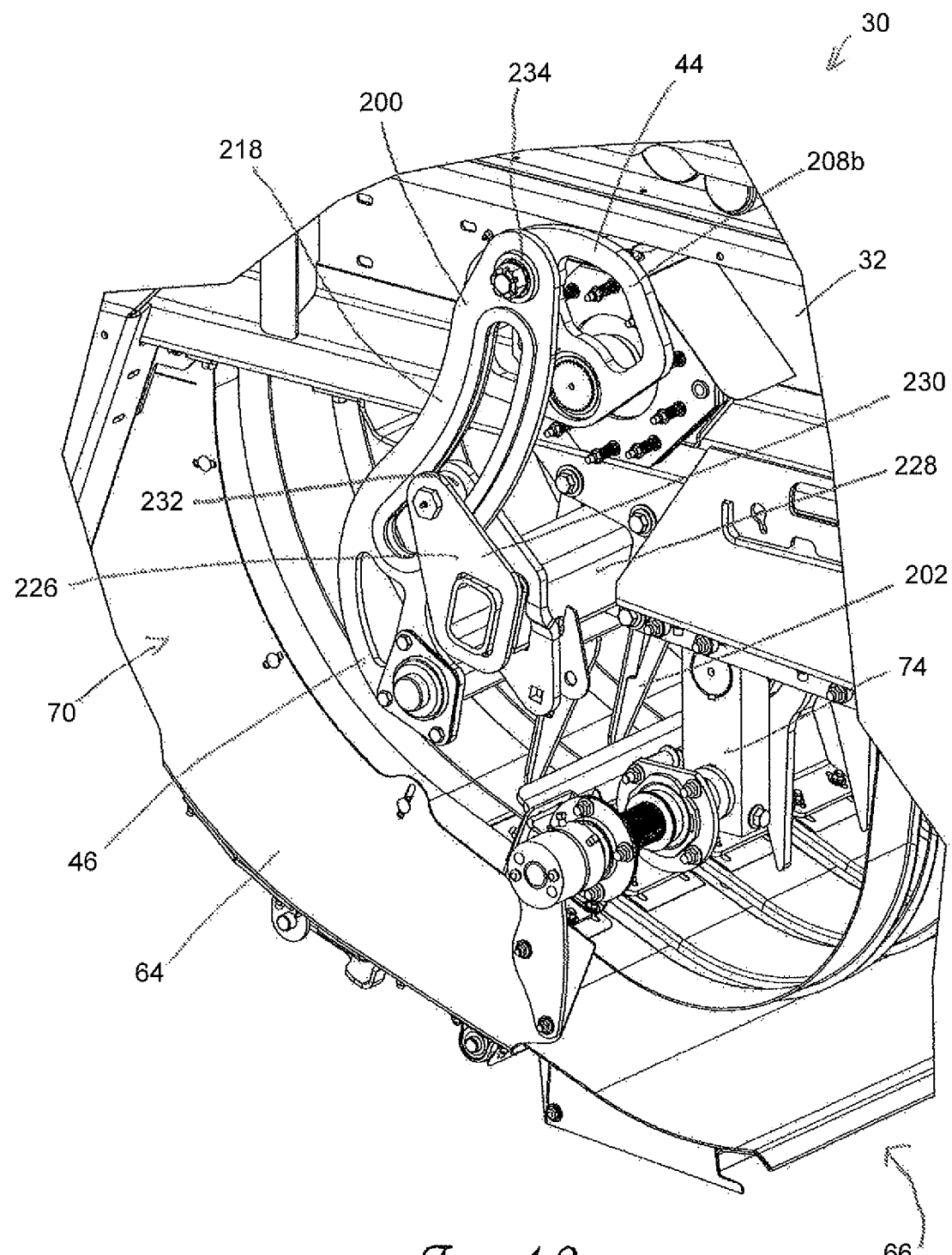
FIG. 13 is a fragmentary front perspective of the agricultural square baler similar to FIG. 11, but taken from the opposite side of the baler.
Figure 14:
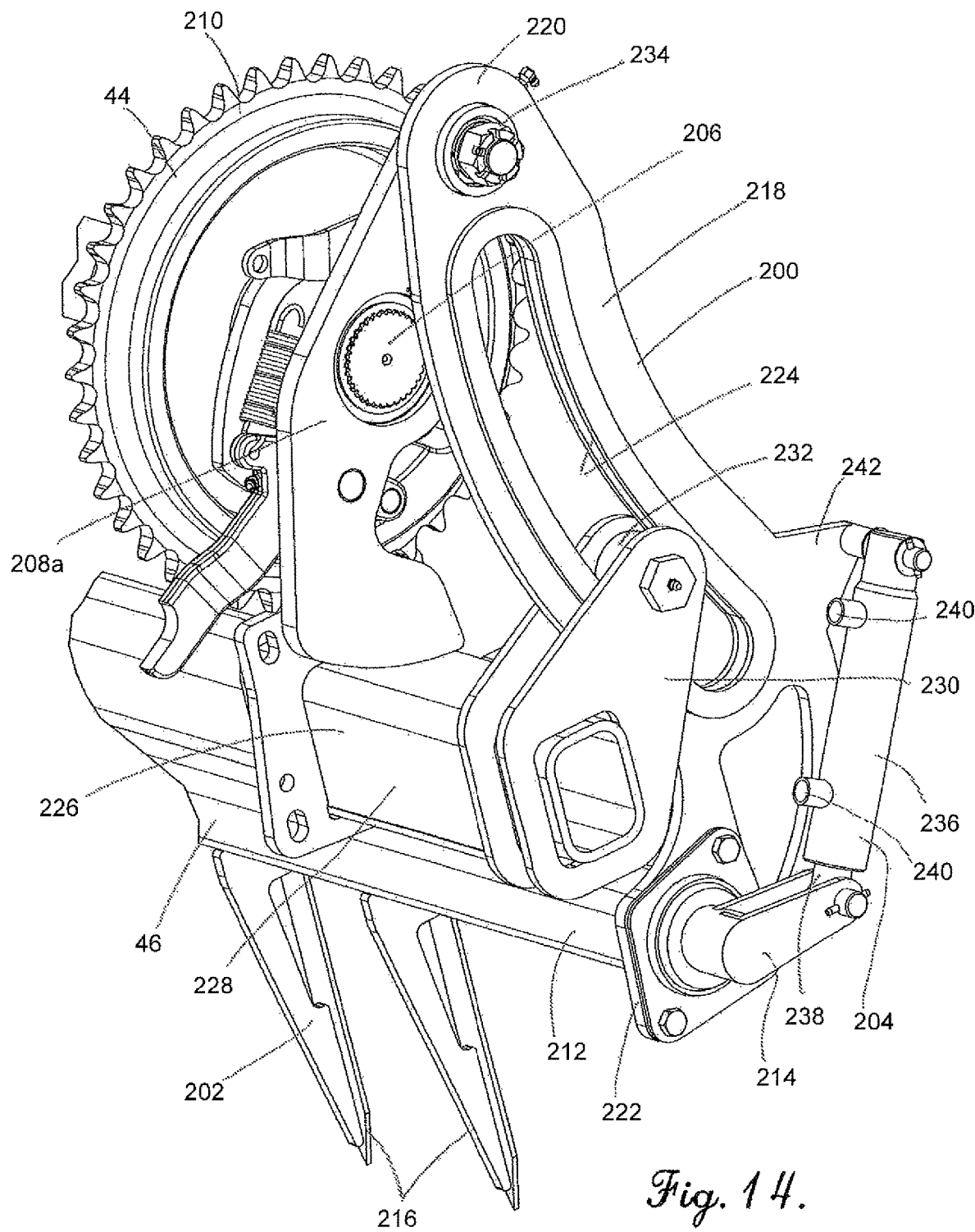
FIG. 14 is an enlarged front perspective of the stuffer drive and stuffer shown in FIGS. 1, 2, and 11-13, showing a fork, frame, and hydraulic cylinder of the stuffer.
Figure 15:
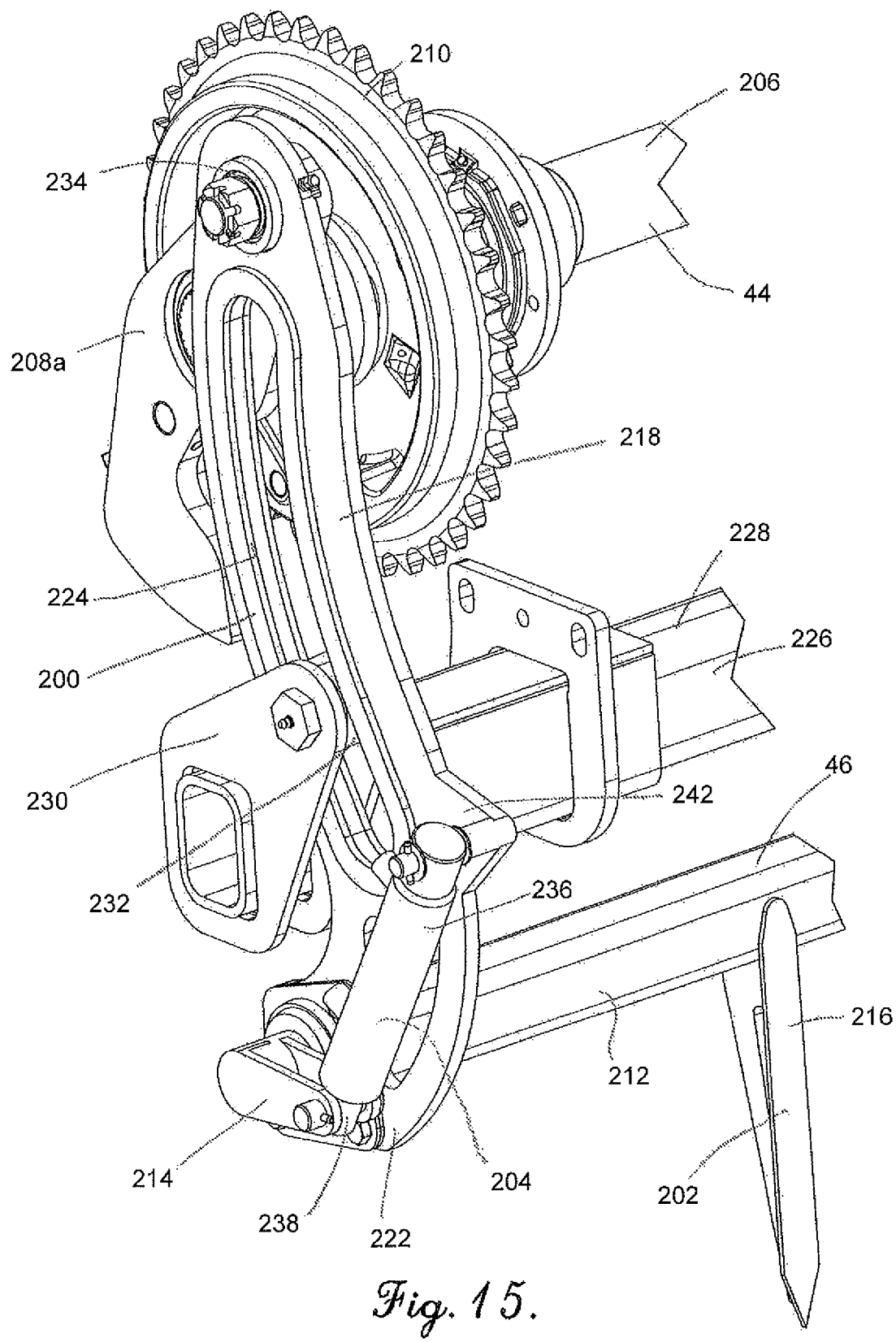
FIG. 15 is an enlarged rear perspective of the stuffer drive and stuffer similar to FIG. 14, but taken from the rear of the stuffer.
Figure 16:
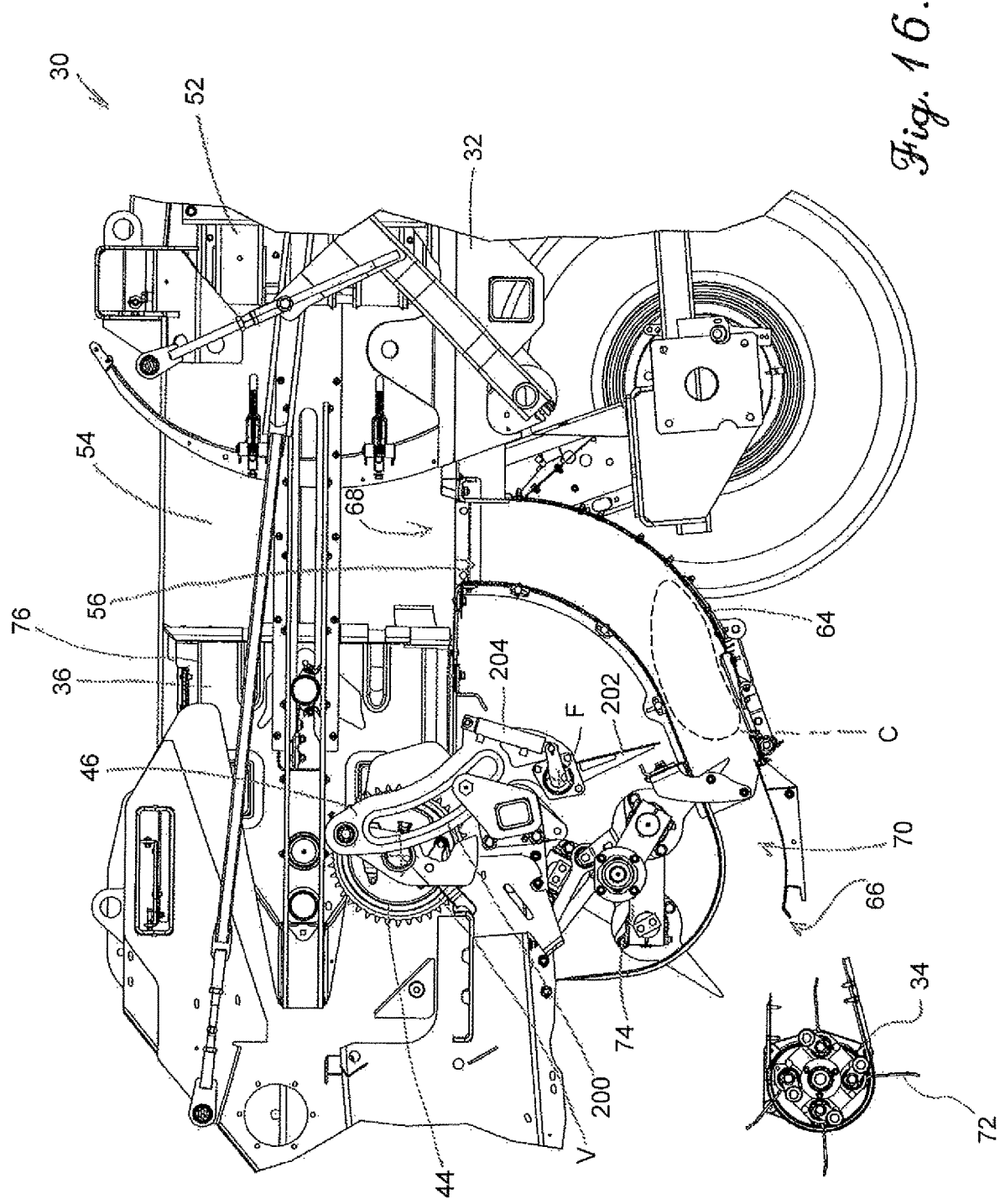
FIG. 16 is a fragmentary side elevation of the agricultural square baler shown in FIGS. 1 and 2, showing a charge of loose crop material within a loading duct of the baler, with the fork of the stuffer in a starting location.

The stuffer fork 202 includes a mounting tube 212 that extends laterally across the width of the baler 30, a lever 214 fixed to an end of the mounting tube 212, and a series of prongs 216 that are fixed to the mounting tube 212 and spaced along the length thereof (see FIGS. 13-15). The prongs 216 are generally parallel to one another and point in a common direction. The stuffer fork 202 is configured to move along the length of the duct passage 70 during a stuffing stroke.

The stuffer frame 200 preferably includes a pair of links 218 that operably interconnect the crank arms 208 and the stuffer fork 202. Each link 218 comprises a unitary, plate-like structure that is elongated and presents opposite crank and fork ends 220,222 (see FIGS. 13-15). The link 218 also presents a curved slot 224 that extends longitudinally between the ends 220,222.

The fork ends 222 of the links 218 are pivotally attached to corresponding ends of the mounting tube 212. This pivoting connection permits the fork 202 to pivot relative to the links 218 about a fork axis F (see FIGS. 16-20). As will be discussed, the fork 202 can be pivoted to control the amount of crop material loaded into the baling chamber 54.

The links 218 cooperate with the crank arms 208 and a stuffer guide 226 of the chassis 32 to direct the fork 202 through a stuffing stroke and a return stroke (see FIGS. 13-15). The stuffer guide 226 is positioned generally above the duct passage 70 and includes a support beam 228 and arms 230 attached to each end of the support beam 228 (see FIGS. 13-15). The stuffer guide 226 also includes roller bearings 232 rotatably supported on the corresponding arms 230.

The links 218 are slidably attached to the stuffer guide 226 by removably locating the bearings 232 within respective slots 224 of the links 218. The links 218 and the stuffer guide 226 are configured to permit sliding movement of the bearings 232 along the length of the slots 224.

The crank ends 220 of the links 218 are rotatably attached to the crank arms 208 to form pivot joints 234. The joints 234 allow the links 218 to follow the crank arms 208 as the crank arms 208 spin about the drive axis V.

The crank arms 208, links 218, and stuffer guide 226 cooperatively move the fork 202 along a stuffing stroke from a starting location (see FIG. 16), where the fork 202 is ready to be inserted into the duct passage 70 behind the charge C of crop material, to a loading location (see FIG. 20), where the fork 202 has swept the charge C of crop material upwardly and rearwardly into the baling chamber 54.

During the stuffing stroke, the fork 202 moves from the starting location, where the fork 202 is located entirely outside of the duct passage 70, to an insertion location, where the prongs 216 of the fork 202 are inserted partly into the duct passage 70 between the inlet 66 and the outlet 68. Preferably, more than half the length of each prong 216 is received by the duct passage 70 in the insertion location.

From the insertion location, the fork 202 sweeps upwardly and rearwardly toward an intermediate location between the insertion location and the loading location. The fork 202 continues to sweep upwardly and rearwardly when moving from the intermediate location to the loading location.

After the stuffing stroke, the crank arms 208, links 218, and stuffer guide 226 cooperatively move the fork 202 in a return stroke from the loading location to the starting location. As the fork 202 travels through the return stroke, the prongs 216 of the fork 202 generally travel outside of the duct 64. Continued rotation of the stuffer drive 44 causes the stuffer 46 to move through a repeating series of stuffing strokes and return strokes. Preferably, the series of stuffing strokes produced by rotation of the stuffer drive 44 have generally the same stroke length.

As mentioned, the fork 202 is preferably rotatably mounted to the links 218. The cylinder 204 is configured to pivot the fork 202 relative to the links 218 between a sweeping position (see FIG. 18), where the fork 202 extends at least partly into the duct 64, and a retracted position (see FIG. 19), where the fork 202 is moved out of the duct 64. The cylinder 204 is part of a baler hydraulic system that includes the pump 40, among other hydraulic components.

The cylinder 204 comprises a hydraulic cylinder with a cylinder housing 236 and a piston component 238 that slides relative to the cylinder housing 236 (see FIGS. 14 and 15). The cylinder housing 236 includes ports 240 that are configured to transmit hydraulic fluid to and from the cylinder 204 (see FIG. 14). The ports 240 are fluidly connected to hydraulic lines (not shown) that are fluidly connected to the pump 40.

The cylinder 204 is mounted so that the cylinder housing 236 is pivotally connected to a tab 242 of the link 218 (see FIG. 14). Also, the piston component 238 is pivotally mounted to an end of the lever 214. As the piston component 238 extends and retracts relative to the cylinder housing 236, the entire fork 202 (including the lever 214) pivots relative to the links 218.

Figure 19:
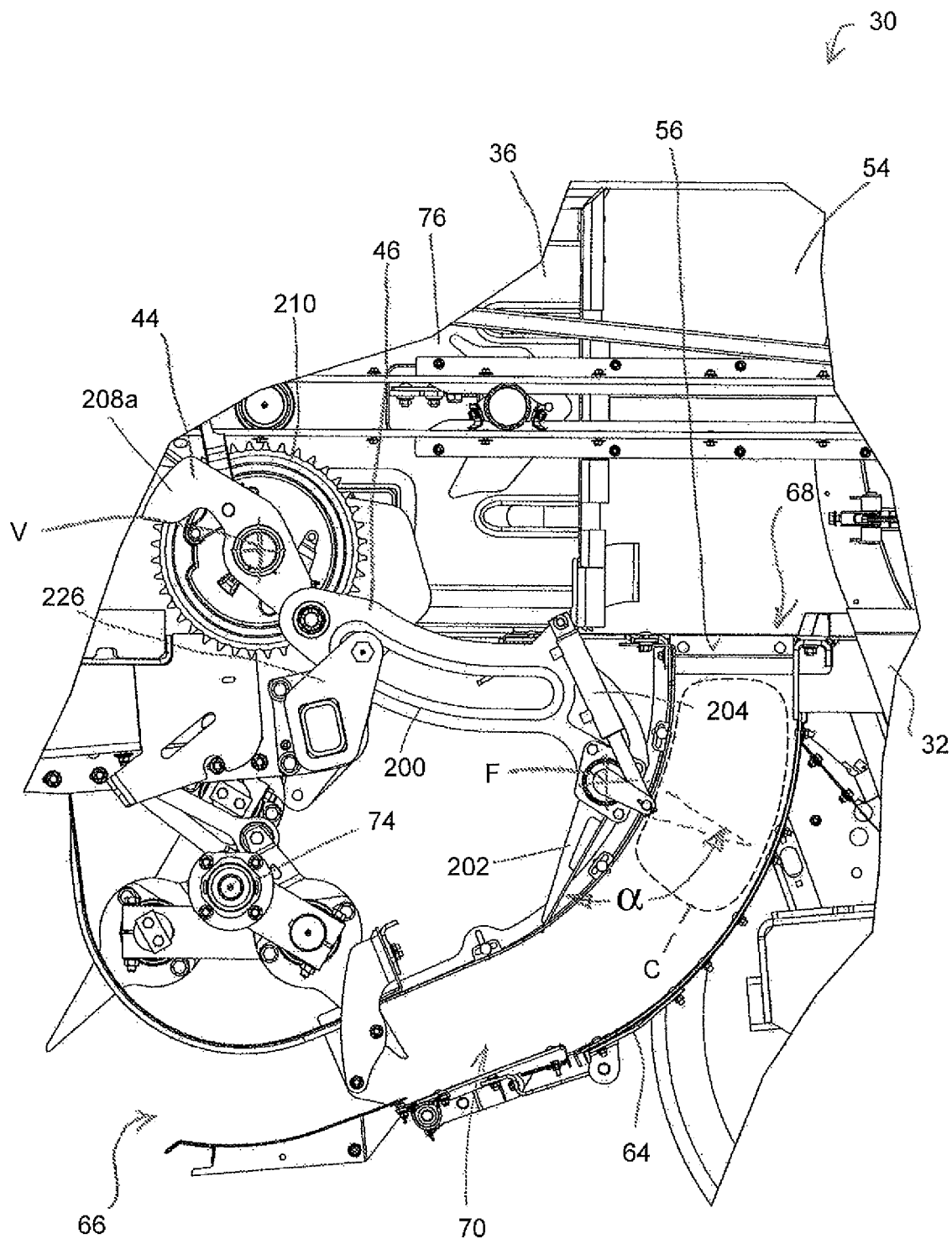
FIG. 19 is a fragmentary side elevation of the agricultural square baler similar to FIG. 18, but with the fork of the stuffer being advanced from the intermediate location and the fork being pivoted to a retracted position to provide a partial stuffing stroke where the charge of loose crop material is not advanced into the baling chamber.

The cylinder 204 is configured so that a retraction angle α is defined between the sweeping position and the retracted position (see FIG. 19). The retraction angle α preferably ranges from about ninety-five degrees (95°) to about one hundred fifteen degrees (115°). However, for some aspects of the present invention, the retraction angle α could fall outside of this range.

The illustrated cylinder 204 is preferably used to power the fork 202 between the sweeping and retracted positions. However, the stuffer 46 could use an alternative motor without departing from the scope of the present invention. For instance, the stuffer 46 could include an electric linear motor to control the fork position. Furthermore, the stuffer 46 could use a rotating electric motor, such as a servo motor.

The baler 30 preferably includes a sensor to sense the rotational position of the fork 202 relative to the frame 200. For instance, the stuffer 46 could include a rotary encoder to provide electronic sensing of the rotational position of the fork 202. The rotary encoder can be used to identify and/or trigger when to shift the fork 202 from the sweeping position to the retracted position (e.g., to provide a partial stuffing stroke). For instance, the baler 30 could include a computer (not shown) that automatically moves the fork 202 to the retracted position when the sensed position value exceeds a predetermined limiting value of position (e.g., where the limiting value is associated with the fork 202 being in the intermediate location).

Alternatively, the baler 30 could include a sensor to sense the resistant force being applied to the fork 202 by the charge C of crop material. For example, the hydraulic system of the baler 30 could include a pressure sensor that fluidly communicates with one of the ports to sense the hydraulic pressure within the cylinder 204. A pressure sensor, force sensor, and/or another type of sensor can also be used to identify and/or trigger when to shift the fork 202 from the sweeping position to the retracted position. Again, the baler 30 could include a computer that automatically moves the fork 202 to the retracted position when the sensed value (e.g., pressure, force, etc.) exceeds a predetermined limiting value. For instance, if the hydraulic pressure associated with the cylinder 204 falls below a predetermined pressure during the stuffing stroke (e.g., because the charge of crop material is too thin), the computer could automatically retract the fork 202.

The cylinder 204 is configured to be used with the stuffer 46 to selectively provide a full stuffing stroke and a partial stuffing stroke. A full stuffing stroke refers to a stuffing stroke where the fork 202 is in the sweeping position during the entire stroke. Specifically, the fork 202 remains in the sweeping position when moving, in succession, along the starting location (see FIG. 16), the insertion location (see FIG. 17), the intermediate location (see FIG. 18), and the loading location (see FIG. 20). During the full stuffing stroke, the fork 202 is operable to load the charge C of loose crop material from the loading duct 64 into the baling chamber 54.

Preferably, the cylinder 204 holds the fork 202 extended at least partly within the duct while the fork 202 is in the sweeping position. However, an alternative positioning mechanism could be used to position and hold the fork 202 extended in the sweeping position. For instance, the baler 30 could include a releasable latching element to position and hold the fork 202 in the sweeping position by releasably engaging the fork 202. It will be understood that such an alternative positioning element could be used as an alternative to the cylinder 204 or in combination with the cylinder 204.

The hydraulic system of the baler 30 preferably includes a hydraulic valve (not shown) that fluidly communicates with one of the ports 240 to selectively restrict fluid flow to and from the port 240. In particular, when the valve is closed, the valve restricts fluid flow to and from the port 240. When the valve is open, the valve permits fluid flow to and from the port.

When the fork 202 is being used in the sweeping position, the valve can be closed to lock the cylinder 204 in the sweeping position. For instance, during a full stuffing stroke, the valve is preferably closed so that the cylinder is locked in the sweeping position.

A partial stuffing stroke refers to a stuffing stroke where the fork 202 is in the retracted position for at least part of the stuffing stroke. For instance, in one type of partial stuffing stroke, the fork 202 is in the sweeping position at the starting location (see FIG. 16), at the insertion location (see FIG. 17), and at the intermediate location (see FIG. 18). At the intermediate location of the partial stuffing stroke, the cylinder 204 then swiftly pivots the fork 202 from the sweeping position to the retracted position (see FIG. 19). The fork 202 then remains in the retracted position through the end of the partial stuffing stroke at the loading location. The fork 202 can then be rotated back to the sweeping position when returning to the starting location.

With the fork 202 in the retracted position during at least part of the stuffing stroke, the fork 202 is preferably configured so that at least some of the charge C of loose crop material in the loading duct 64 is not loaded into the baling chamber 54. More preferably, during the partial stuffing stroke, the fork 202 is configured so that generally none of the charge C of crop material in the loading duct 64 is loaded into the baling chamber 54.

During the partial stuffing stroke, the fork 202 is preferably configured to move a charge C of loose crop material rearwardly and upwardly along the duct 64 without loading the charge C into the baling chamber 54.

While the illustrated retracted position is preferred for the partial stuffing stroke, the fork 202 could be located in an alternative retracted position. For instance, the fork 202 could be rotated to a position between the illustrated retracted position and the sweeping position to provide a partial stuffing stroke.

It will be appreciated that the sequence of fork positions during the stuffing stroke could be altered without departing from the scope of the present invention. For instance, the fork 202 could be shifted from the sweeping position to the retracted position at a location before or after the intermediate location. Yet further, it will be understood that the fork 202 could be retracted and/or extended multiple times during a single stuffing stroke.

Operation

In use, the baler 30 is preferably started with the drive 90 in the speed reducing condition, where the drive sheave is in the open position. If necessary, the baler hydraulic system is used to shift the drive sheave 94 from the closed position to the open position prior to starting the baler 30. With the drive sheave 94 in the open position, the spring 124 of the driven sheave 96 moves the driven sheave 96 to the normally closed position. Again, it has been found that the speed reducing condition is effective for initiating baler operation because the baler mechanisms have a substantial combined mass and, consequently, are difficult to start.

Once the baler 30 has achieved steady state operation at the reduced speed, the drive 90 can be shifted into the speed increasing condition. Specifically, the baler hydraulic system is used to shift the drive sheave 94 from the open position to the closed position. With the drive sheave 94 in the closed position, the spring 124 of the driven sheave 96 permits the driven sheave 96 to move to the open position.

During baler operation, the fork 202 of the stuffer 46 is generally positioned to provide a full stuffing stroke so that the fork 202 loads the charge C of loose crop material from the loading duct 64 into the baling chamber 54. If the charge C of loose crop material becomes too small to load into the baling chamber 54, the stuffer 46 can be shifted to the retracted position for at least part of a stuffing stroke. For example, a partial stuffing stroke can be provided by moving the cylinder 204 in the intermediate location to pivot the fork 202 from the sweeping position to the retracted position (see FIG. 19). The fork 202 can then be rotated back to the sweeping position when returning to the starting location.

To shut down the baler 30, the drive 90 can be initially returned to the speed reducing condition to slow down the baler mechanism. In the speed reducing condition, power to the drive 90 can be cut off entirely to the drive 90. However, the baler 30 could be alternatively shut down by cutting off power to the drive 90 without returning the drive 90 to the speed reducing condition.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A square baler operable to be powered by a prime mover, said square baler comprising:
  a chassis presenting a baling chamber in which material is compacted and baled;
  a plunger assembly including a reciprocating plunger head slidably mounted relative to the chassis and operable to reciprocate within the chamber to apply a compressive force against the material; and
  a variable speed transmission including drive and driven components and an endless drive element that drivingly interconnects the components, said driven component being drivingly connected to the plunger head, said drive component operable to be driven by the prime mover at a drive input speed, and at least one of said components having an adjustable operating diameter so that the driven component has a variable output speed, said drive and driven components having respective drive and driven operating diameters that are adjustable so as to cooperatively vary the speed of the driven component, said drive and driven components each including a pair of opposed cones that are configured to receive the drive element therebetween, and said cones being shiftable relative to one another to define the respective operating diameter, said cones of the drive component cooperatively presenting a hydraulic chamber configured to receive pressurized hydraulic fluid, with an addition and removal of hydraulic fluid to the chamber shifting the cones relative to one another to vary the drive operating diameter, and said transmission including a spring to urge the cones of the drive component into a normally open position and said driven component including a spring to urge the cones of the driven component toward a normally closed position, and said drive element being shifted in the normally closed position to urge the cones of the drive component into the normally open position.

2. The square baler as claimed in claim 1, further comprising a flywheel rotatably supported by the chassis and operably connected to the plunger assembly to drive the plunger head, said driven component being drivingly connected to the flywheel.

3. A square baler operable to be powered by a prime mover, said square baler comprising:
    a chassis presenting a baling chamber in which material is compacted and baled;
    a plunger assembly including a reciprocating plunger head slidably mounted relative to the chassis and operable to reciprocate within the chamber to apply a compressive force against the material; and
    a variable speed transmission including drive and driven components and an endless drive element that drivingly interconnects the components, said driven component being drivingly connected to the plunger head, said drive component operable to be driven by the prime mover at a drive input speed, wherein said drive and driven components having respective drive and driven operating diameters that are adjustable so as to cooperatively vary the speed of the driven component to produce a variable output speed, said drive and driven components each including a pair of opposed cones that are configured to receive the drive element therebetween, and said cones being shiftable relative to one another to define the respective operating diameter, and wherein said cones of the drive component cooperatively presenting a hydraulic chamber configured to receive pressurized hydraulic fluid, with an addition and removal of hydraulic fluid to the chamber shifting the cones relative to one another to vary the drive operating diameter, and wherein:
        said transmission having an adjustable speed ratio of the output speed to the input speed;
        said cones of the drive component being shiftable into and out of a normally open position; and
        said speed ratio being less than 1 in the normally open position.

4. The square baler as claimed in claim 3, said transmission including a spring to urge the cones of the drive component into the normally open position and said driven component including a spring to urge the cones of the driven component toward a normally closed position, and said drive element being shifted in the normally closed position to urge the cones of the drive component into the normally open position.

5. The square baler as claimed in claim 3, said speed ratio being at a minimum value in the normally open position.

6. A square baler operable to be powered by a prime mover, said square baler comprising:
    a chassis presenting a baling chamber in which material is compacted and baled;
    a plunger assembly including a reciprocating plunger head slidably mounted relative to the chassis and operable to reciprocate within the chamber to apply a compressive force against the material; and
    a variable speed transmission including drive and driven components and an endless drive element that drivingly interconnects the components, said driven component being drivingly connected to the plunger head, said drive component operable to be driven by the prime mover at a drive input speed, and at least one of said components having an adjustable operating diameter so that the driven component has a variable output speed, said at least one component including a pair of opposed cones that are configured to receive the drive element therebetween, and said cones being shiftable relative to one another to define the adjustable operating diameter, said cones cooperatively presenting a hydraulic chamber configured to receive pressurized hydraulic fluid, with an addition and removal of hydraulic fluid to the chamber shifting the cones relative to one another to vary the adjustable operating diameter, said cones being shiftable into and out of a normally unpressurized condition where hydraulic pressure is removed from the hydraulic chamber, and said transmission having an adjustable speed ratio of the output speed to the input speed, and said speed ratio being less than 1 in the normally unpressurized condition.

7. The square baler as claimed in claim 6, said speed ratio being at a minimum value in the normally unpressurized condition.

* * * * *